(12) United States Patent
Conrad

(10) Patent No.: US 8,613,158 B2
(45) Date of Patent: Dec. 24, 2013

(54) METHOD FOR GROUPING A PLURALITY OF GROWTH-INDUCED SEEDS FOR COMMERCIAL USE OR SALE BASED ON TESTING OF EACH INDIVIDUAL SEED

(75) Inventor: Robert Conrad, Wheaton, IL (US)

(73) Assignee: Ball Horticultural Company, West Chicago, IL (US)

( * ) Notice: Subject to any disclaimer, the term of this patent is extended or adjusted under 35 U.S.C. 154(b) by 1435 days.

(21) Appl. No.: 12/106,029

(22) Filed: Apr. 18, 2008

(65) Prior Publication Data

US 2009/0260281 A1    Oct. 22, 2009

(51) Int. Cl.
*A01C 1/00*    (2006.01)

(52) U.S. Cl.
USPC .......................................... 47/58.1 SE; 47/14

(58) Field of Classification Search
USPC ... 47/58.1 SE, 14, 58.1 R, 1.01 R, FOR. 100, 47/DIG. 9; 382/110, 286; 800/298, 295
See application file for complete search history.

(56) References Cited

U.S. PATENT DOCUMENTS

| | | |
|---|---|---|
| 3,530,372 A | 9/1970 | Laukien |
| 3,852,914 A | 12/1974 | Levengood |
| 3,992,814 A | 11/1976 | Hagner et al. |
| 4,015,366 A | 4/1977 | Hall, III |
| 4,141,390 A | 2/1979 | Arnold et al. |
| 4,168,002 A | 9/1979 | Crosby |
| 4,230,983 A | 10/1980 | Steere et al. |
| 4,315,380 A | 2/1982 | Davidson |
| 4,333,096 A | 6/1982 | Jenkins et al. |
| 4,430,828 A | 2/1984 | Oglevee et al. |
| 4,467,560 A | 8/1984 | Simak |
| 4,658,539 A | 4/1987 | Sluis |
| 4,905,411 A | 3/1990 | Finch-Savage |
| 4,912,874 A | 4/1990 | Taylor |
| 4,975,364 A | 12/1990 | Taylor et al. |
| 5,073,503 A | 12/1991 | Mee |
| 5,130,545 A | 7/1992 | Lussier |
| 5,232,465 A | 8/1993 | White et al. |
| 5,462,879 A | 10/1995 | Bentsen |
| 5,567,598 A | 10/1996 | Stitt et al. |
| 5,628,144 A | 5/1997 | Eastin |
| 5,659,623 A | 8/1997 | Conrad |

(Continued)

FOREIGN PATENT DOCUMENTS

| | | |
|---|---|---|
| AU | 2001244846 B2 | 9/2001 |
| CA | 2403253 A1 | 9/2001 |

(Continued)

OTHER PUBLICATIONS

Union Biometra, Applications—Agriculture (Seeds), Retrieved from the Internet on Apr. 30, 2008: URL:http://www.unionbiometrica.com/applications/app_notes/app_agri.html.

(Continued)

*Primary Examiner* — Trinh Nguyen
(74) *Attorney, Agent, or Firm* — Marshall, Gerstein & Borun LLP; Randall G. Rueth

(57) ABSTRACT

A method and system for producing a group of growth-induced seeds for commercial use or sale, the method including monitoring a physiological indication and/or morphometric indication for a seed, automatically determining if the monitored seed has a specific characteristic, separating the monitored seed having the specific characteristic into a group of seeds for commercial use or sale so that each and every seed in the group has been monitored and determined to have the specific characteristic.

18 Claims, 15 Drawing Sheets

(56) References Cited

U.S. PATENT DOCUMENTS

| | | | |
|---|---|---|---|
| 5,863,460 | A | 1/1999 | Slovacek et al. |
| 5,864,984 | A | 2/1999 | McNertney |
| 5,873,197 | A | 2/1999 | Rowse et al. |
| 5,901,237 | A | 5/1999 | Conrad |
| 5,910,050 | A | 6/1999 | Eastin |
| 6,024,923 | A | 2/2000 | Melendez et al. |
| 6,076,301 | A | 6/2000 | Eastin |
| 6,080,950 | A | 6/2000 | Jalink |
| 6,112,457 | A | 9/2000 | Kohno et al. |
| 6,150,158 | A | 11/2000 | Bhide et al. |
| 6,232,270 | B1 | 5/2001 | Branly et al. |
| 6,236,739 | B1 | 5/2001 | Conrad |
| 6,306,620 | B1 | 10/2001 | Templeton et al. |
| 6,313,377 | B1 | 11/2001 | Schipper et al. |
| 6,340,594 | B1 | 1/2002 | Attree et al. |
| 6,372,496 | B1 | 4/2002 | Attree et al. |
| 6,563,122 | B1 | 5/2003 | Lüdecker et al. |
| 6,646,264 | B1 | 11/2003 | Modiano et al. |
| 6,706,989 | B2 | 3/2004 | Hunter et al. |
| 6,882,740 | B1 | 4/2005 | McDonald, Jr. et al. |
| 6,947,810 | B2 | 9/2005 | Skinner |
| 7,123,750 | B2 | 10/2006 | Lu et al. |
| 7,218,775 | B2 | 5/2007 | Kokko et al. |
| 7,372,978 | B2 | 5/2008 | McDonald, Jr. et al. |
| 2004/0033575 | A1 | 2/2004 | Van Duijn et al. |
| 2004/0055211 | A1 | 3/2004 | Lestander et al. |
| 2004/0224301 | A1 | 11/2004 | Toland et al. |
| 2004/0241635 | A1 | 12/2004 | Buckley |
| 2004/0267457 | A1 | 12/2004 | Timmis et al. |
| 2005/0112715 | A1 | 5/2005 | Zayed et al. |

FOREIGN PATENT DOCUMENTS

| | | |
|---|---|---|
| DE | 60108480 T2 | 3/2006 |
| DK | 1264176 T3 | 5/2005 |
| EP | 0 333 253 A2 | 9/1989 |
| EP | 0 448 923 A1 | 10/1991 |
| EP | 0 509 791 A1 | 10/1992 |
| EP | 1134583 A1 | 9/2001 |
| EP | 1264176 B1 | 1/2005 |
| ES | 2236202 T3 | 7/2005 |
| GB | 2 132 348 A | 7/1984 |
| SU | 1645893 A1 | 4/1991 |
| SU | 19884460764 | 4/1991 |
| WO | WO 96/36875 | 11/1996 |
| WO | WO 98/12348 | 3/1998 |
| WO | WO 98/54354 | 12/1998 |
| WO | WO/0169243 A1 | 9/2001 |

OTHER PUBLICATIONS

Bergervoet et al., Sorting of Different Arabidopsis Seed Types, Retrieved from the Internet on Jun. 16, 2008: http://www.unionbio.com/applications/app_notes/agri_files/QTN002_Arabidopsis.pdf.

Bouldin & Lawson, "Bouldin & Lawson Equipment Videos," Retrieved from the Internet on Apr. 30, 2008: URL:http://www.bouldinlawson.com/htm/movies.htm.

Bouldin & Lawson, Blow-Out & Fixing, Retrieved from the Internet on Apr. 30, 2008: URL:http://www.bouldinlawson.com/Equipment/TTA%20Equipment/Blow-Out%20&%20Fixing%20Brochure.pdf.

Heinz Walz GmbH, Photosynthesis Yield Analyzer Mini-Pam, Portable Chlorophyll Fluorometer-Handbook of Operation, Retrieved from the Internet on Apr. 30, 2008: URL:http://walz.com/support/downloads/downloads/pdfs/minip_lea.pdf (Outline at pp. I-III and also pp. 1-3 are provided; web site provides entire article; reference is listed as an example of monitoring for photosynthesis).

"An Introduction to Near Infrared Spectroscopy," A.M.C. Davies (Editor NIR news, Norwich Near Infrared Consultancy, 75 Intwood Road, Cringleford, Norwich NR4 6AA, UK).

"Topic 7: Seed Germination & Dormancy" Retrieved from the Internet near Apr. 2007—explanatory article—no further internet identification is available.

Goodman et al., Harcourt Brace Jovanovich, "Biology," 1986, pp. 408-409.

Bradford et al., "Quantifying the Oxygen Sensitivity of Seed Germination Using a Population-Based Threshold Model," Seed Science Research (2007), 17, pp. 33-43.

Lichao et al., "A New Biosensor for Rapid Oxygen Demand Measuement," Water Environment Research, vol. 70, No. 5, pp. 1070-1074.

Cox et al., "Detection of Oxygen by Fluorescence Quenching, Applied Optics," vol. 24, No. 14, pp. 2114-2120.

Gidrol et al., "Accumulation of Reactive Oxygen Species and Oxidation of Cytokinin in Germinating Soybean Seeds," Eur. J. Biochem 224, pp. 21-28.

Abele et al., "Temporal Flucuations and Spatial Gradients of Environmental $P_{o2}$, Temperature, $H_2O_2$ and $H_2S$ in its Intertidal Habit Trigger Enzymatic Antioxidant Protection in the Capitellid Worm Heteromastus Filiformis," Marine Ecology Progress Series, vol. 163: pp. 179-191.

Bambot, et al., "Phase Fluorometric Sterilizable Optical Oxygen Sensor," Biotechnology and Bioengineering, vol. 43, pp. 1139-1145.

Barnikol, et al., "An Innovative Procedure for the Detection of Oxygen Based on Luminescence Quenching, for Use in Medicine, Biology," Environmental Research and Biotechnology, Biomed. Technik 41 (1996), pp. 170-177.

Barnikol, et al., "Microdetector for Rapid Changes of Oxygen Partial Pressure ($pO_2$) During the Respiratory Cycle in Small Laboratory Animals," Rev. Sci. instrum. 59 (7), pp. 1204-1208.

Chugh et al., "Effect of Cadmium on Germination, Amylases and Rate of Respiration of Germinating Pea Seeds," Enviorrunental Pollution, vol. 92, No. 1, pp. 1-5.

Holst, et al., "FLOX—An Oxygen-Flux-Measuring System Using a Phase-Modulation Method to Evaluate the Oxygen-Dependent Fluorescence Lifetime," Sensors and Actuators B 29 (1995), pp. 231-239.

Marazuela, et al., "Luminescence Lifetime Quenching of a Ruthenium (II) Polypyridyl Dye for Optical Sensing of Carbon Dioxide," Society for Applied Spectroscopy, vol. 52, No. 10, pp. 1314-1320.

Meier, et al., "Novel Oxygen Sensor Material Based on a Ruthenium Bipyridyl Complex Encapsulated in Zeolite Y: Dramatic Differences in the Efficiency of Luminescence Quenching by Oxygen on Going from Surface-Adsorbed to Seolite-Encapsulated Fluorophores," Sensors and Actuators B 29 (1995), pp. 240-245.

Hartmann, et al., "Plant Propagation Principles and Practices," Second Edition, Prentice Hall, Inc., pp. 120-121, 138.

Yeoung, "Effects of Water Potential and Oxygen Concentration on Respiration During Muskmelon Seed Priming," J. Kor. Soc. Hort. Sci. (1995) 36 (6), pp. 774-779.

International Search Report for PCT/US09/36649 mailed Jul. 1, 2009.

Written Opinion for PCT/US09/36649 mailed Jul. 1, 2009.

Union Biometra, Applications—Agriculture (Seeds), retrieved from the Internet on Apr. 30, 2008 at: <http:www.unionbiometrica.com/applications/app_notes/app_agri.html> (2007).

Bergervoet et al., Sorting of different Arabidopsis seed types, retrieved from the Internet on Jun. 16, 2008 at: <http://www.uniobio.com/applications/app_notes/agri-Files/QTN002_Arabidopsis.pdf> (Sep. 2003).

Bouldin & Lawson, Bouldin & Lawson Equipment Videos, retrieved from the Internet on Apr. 30, 2008 at: <http://www.bouldinlawson.com/htm.movies.htm> (2004).

Bouldin & Lawson, Blow-Out & Fixing, retrieved from the Internet on Apr. 30, 2008 at: <http://www.bouldinlawson.com/Equipment/TTA%20Equipment/Blow-Out%20%&%20Fixing%20Brochure.pdf> (2005).

Heinz Walz GmbH, "Photosynthesis yield analyzer mini-pam, portable chlorophyll fluorometer Handbook of Operation", retrieved from the Internet on Apr. 30, 2008 at: <http://walz.com/support/downloads/downloads/pdfs/minip_1ea.pdf> (outline at pp. I-III and also pp. 1-3 are provided; web site provides entire article; reference is listed as an example of monitoring for photosynthesis) (Aug. 1999).

Davies (ed.), An Introduction to near infrared spectroscopy, A Celebration of Near Infrared Spectroscopy, vol. 16, No. 7 (Oct./Nov. 2005).

(56) References Cited

OTHER PUBLICATIONS

Topic 7: Seed Germination & Dormancy, retrieved from the Internet near Apr. 2007—explanatory article—no further internet identification is available (admitted prior art; applicant's internal files).

Goodman et al., Biology, Harcourt Brace Jovanovich, pp. 408-409 (1986).

Bradford et al., Quantifying the oxygen sensitivity of seed germination using a population-based threshold model, Seed Science Research, 17:33-43 (2007).

Lichao et al., A new biosensor for rapid oxygen demand measurement, Water Environment Res., 70(5):1070-4 (1998).

Cox et al., "Detection of oxygen by fluorescence quenching", Applied Optics, 24(14):2114-20 (1985).

Gidrol et al., Accumulation of reactive oxygen species and oxidation of cytokinin in germinating soybean seeds, Eur. J. Biochem., 224:21-8 (1994).

Abele et al., Temporal fluctuations and spatial gradients of environmental PO2, temperature, H2O2 and H2S in its intertidal habitat trigger enzymatic antioxidant protection in the capitellid worm *Heteromastus filiformis*, Marine Ecology Progress Series, 163:179-91 (1998).

Bambot et al., Phase flurometric sterilizable optical oxygen sensor, Biotechnol. Bioengeer., 43:1139-45 (1993).

Barnikol et al., An innovative procedure for the detection of oxygen based on luminescence quenching, for use in medicine, biology, Environmental Research and Biotechnology, Biomed. Technik, 42:170-7 (1996).

Barnikol et al., Microdetector for rapid changes of oxygen partial pressure (pO2) during the respiratory cycle in small laboratory animals, Rev. Sci. Instrum., 59(7):1204-8 (1988).

Chugh et al., Effect of cadmium on germination, amylases and rate of respiration of germinating pea seeds, Environmental Pollution, 92(1):1-5 (1995).

Hoist et al., FLOX—An oxygen-flux-measuring system using a phase-modulation method to evaluate the oxygen-dependent fluorescence lifetime< Sensors and Actuators B, 29:231-9 (1995).

Marazuela et al., Luminescence lifetime quenching of a ruthenium (II) polypyridyl dye for optical sensing of carbon dioxide, Soc. Appl. Spectroscopy, 52(10):1314-20 (1998).

Meier et al., Novel oxygen sensor material based on a ruthenium bipyridyl complex encapsulated in zeolite Y: dramatic differences in the efficiency of luminescence quenching by oxygen on going from surface-adsorbed to zeolite-encapsulated fluorophores, Sensors and Actuators B, 29:240-5 (1995).

Hartmann et al., Plant Propagation: Principles and Practices, 2nd Edition, Prentice Hall, Inc., pp. 120-121 and 138 (1968).

Yeoung, Effects of water potential and oxygen concentration on respiration during muskmelon seed priming, J. Kor. Soc. Hort. Sci., 36(6):774-9 (1995).

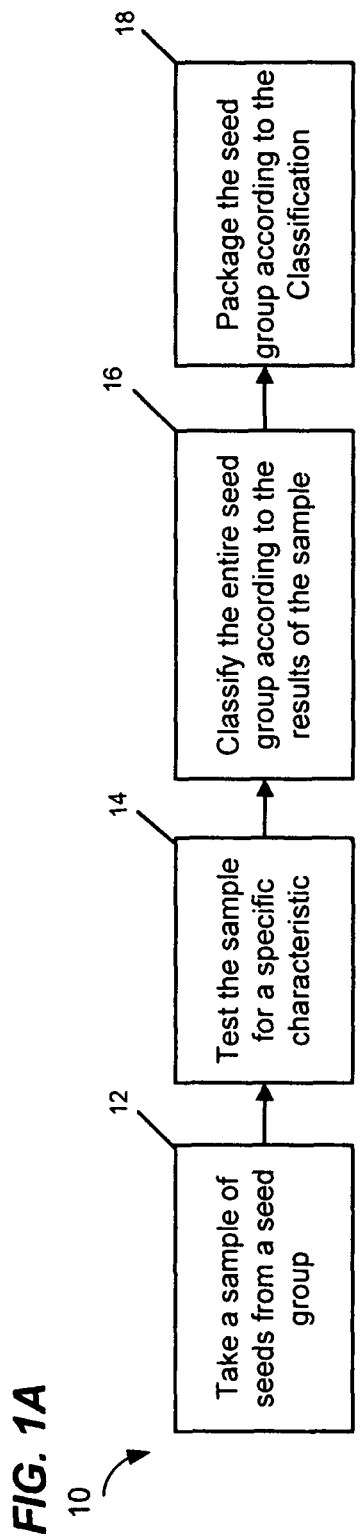

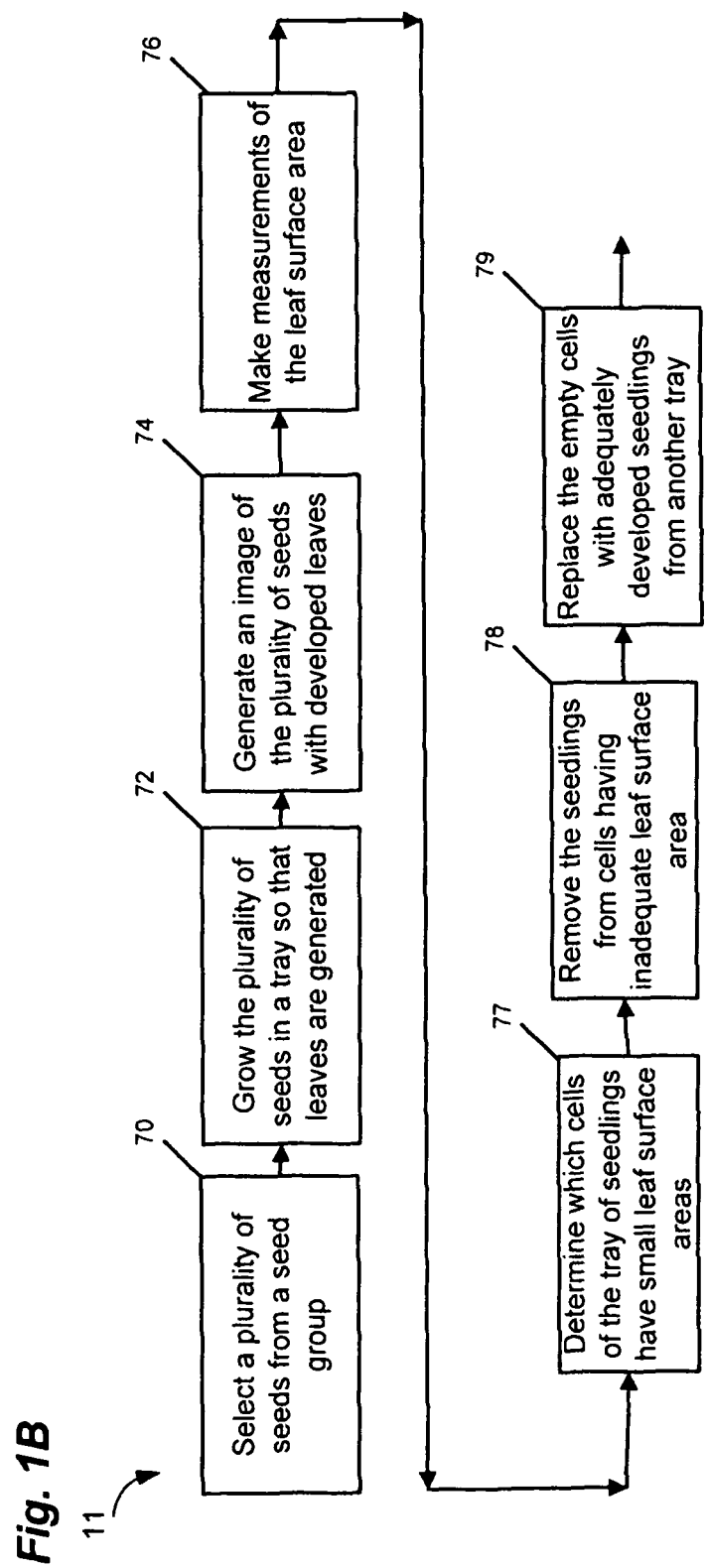

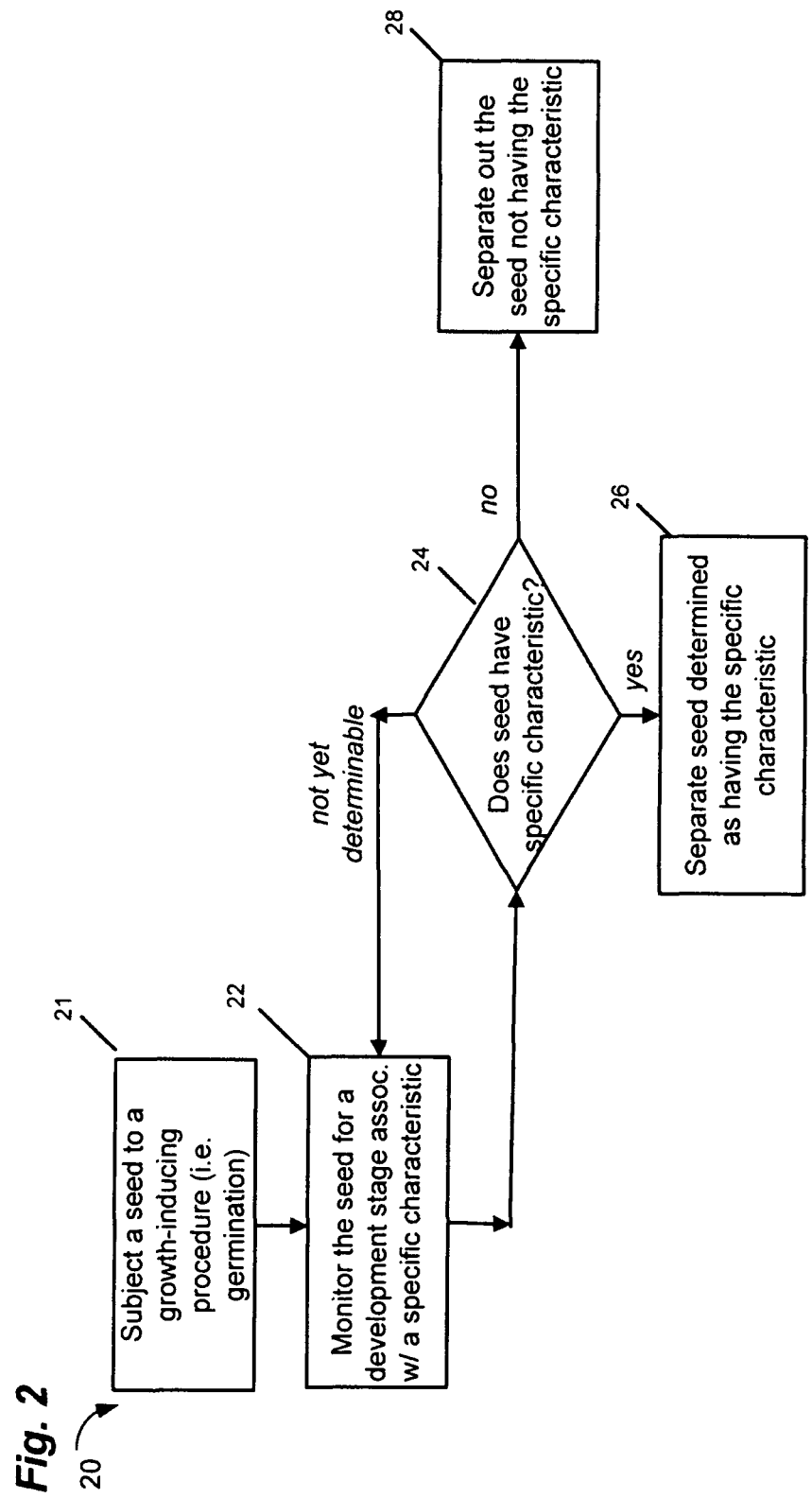

Fig. 10

| Computer-Human | # of Seeds |
|---|---|
| 1-1 | 299 |
| 1-0 | 20 |
| 0-1 | 28 |
| 0-0 | 37 |

FIG. 11

| samplenum | Real Germ | sample | timestamp |
|---|---|---|---|
| 1 | 0 | 344 | 3/16/07 4:18 PM |
| 1 | 0 | 345 | 3/16/07 5:13 PM |
| 1 | 0 | 350 | 3/16/07 6:09 PM |
| 1 | 0 | 347 | 3/16/07 7:05 PM |
| 1 | 0 | 349 | 3/16/07 8:09 PM |
| 1 | 0 | 348 | 3/16/07 9:31 PM |
| 1 | 0 | 348 | 3/16/07 10:32 PM |
| 1 | 0 | 346 | 3/16/07 11:27 PM |
| 1 | 0 | 349 | 3/17/07 12:23 AM |
| 1 | 0 | 352 | 3/17/07 1:30 AM |
| 1 | 0 | 349 | 3/17/07 2:32 AM |
| 1 | 0 | 350 | 3/17/07 3:28 AM |
| 1 | 0 | 351 | 3/17/07 4:28 AM |
| 1 | 0 | 350 | 3/17/07 5:28 AM |
| 1 | 0 | 344 | 3/17/07 6:30 AM |
| 1 | 0 | 349 | 3/17/07 7:30 AM |

ID OF TECHNOLOGY

METHOD FOR GROUPING A PLURALITY OF GROWTH-INDUCED SEEDS FOR COMMERCIAL USE OR SALE BASED ON TESTING OF EACH INDIVIDUAL SEED

FIELD OF TECHNOLOGY

This disclosure relates to a method and system used in the production of a separated group of growth-induced seeds each having a specific characteristic, for later commercial use or sale. Such specific characteristic is determined by the seed market.

DESCRIPTION OF THE BACKGROUND ART

Seed groups or packages are used or sold based on the estimated quality or any other marketable specific characteristic of the seed group. The background art identifies a seed group as having a specific characteristic by testing a sample of the seed group and using the results obtained from the tested sample to identify the entire seed group with respect to that specific characteristic. For example, one type of specific characteristic which can be used to label a seed group is the vigor rating of the seed group. The vigor rating informs potential buyers how vigorous the seeds in the package are expected to be. The way of determining how vigorous the seed group or package is may be determined by testing a sample group from the seed group for a specific vigor indication such as germination. The sample group may be tested for vigor by testing each seed in the sample group for germination by measuring the seed's oxygen consumption at a specific time. According to the background art, the test results, based on the measured oxygen consumption of the sample group of seeds, are used to identify the vigor rating of the entire seed group from which the sample group was taken. Packages of seeds coming from the same group are then classified as having the same vigor rating.

More generally, a seed group may be classified using this method of classification for any type of desired seed classification which is based on testing for a specific characteristic desired by the seed market. Various methods exist which describe sampling a seed group for a specific characteristic to classify the entire seed group as having some classification level of the specific characteristic based on the tested sample group. Background art also describes sorting individual seeds based on their color, weight, or shape. However, nowhere in the background art is it known to analyze each and every seed after it has been imbibed or began to grow for an entire seed group, e.g. amounting to tens of thousands or millions of growth-induced seeds, for a specific characteristic in order to determine whether an individual seed subjected to a growth-inducing environment will be separated and transferred to be a part of a grouping of growth-induced seeds for commercial use or sale where every seed in the grouping or package has been subjected to growth and monitored and determined for a specific characteristic, and thus, can be marketed as such.

Background art also teaches sowing all the seeds of a group of seeds into a plant growing tray. After some time, the background art uses image analysis to identify which cells in the plant tray do not have good quality plants by monitoring for the leaves of the plant tray. The background art takes only an instantaneous image or one-time snapshot of the plant tray so that plant leaf growth per cell of the tray can be evaluated. A gap in the image is defined as an indication that a particular cell or cells in the plant tray contain a poor quality plant and need replacement. After such a determination, the background art removes the existing plant or lack thereof from that particular cell of the tray and places in that cell location an adequately growing plant. Background art does not provide analysis of a plant before the leafing stage starts. Also, the background art does not identify seeds that are more likely to germinate or seedlings that have germinated before placing the seed or seedling (or as used herein the broader term "germinated seed") in a cell of the tray. Such an earlier indication produces a better product to come to market sooner.

SUMMARY OF THE DISCLOSURE

A method in a computer system for producing a group of growth-induced seeds for commercial use or sale, the method including subjecting each and every seed of a seed group to a growth-inducing procedure; monitoring the seed for a development stage associated with a specific characteristic; automatically determining if the monitored seed has the specific characteristic based on information about the monitored development stage of the seed; and separating the seed having the specific characteristic into the group of growth-induced seeds for commercial use or sale so that each and every seed in the group has been monitored and determined to have the specific characteristic.

A method in a computer system for producing a group of growth-induced seeds for commercial use or sale, the method including subjecting a seed to a growth-inducing procedure; monitoring the subjected seed for a rate of development toward a specific characteristic, indicated by one or more of a group including: a physiological indicator associated with the specific characteristic and a morphometric indicator associated with the specific characteristic; determining whether the seed has a specific rate of development toward the specific characteristic is achieved; stopping subjecting the seed to the growth-inducing procedure when the specific rate of development; preserving the seed determined as having the specific rate of development; and separating the seed determined as having the specific rate of development into the group of growth-induced seeds for commercial use or sale so that every seed of the group has been monitored and determined to have a rate of development similar to the specific rate of development.

A method in a computer system for producing a group of growth-induced seeds for commercial use or sale, the method including acquiring a spectral image of a growth-induced seed growing in a location; comparing the spectral image with classification data; assigning a classification to the growth-induced seed according to one or more of a plurality of parts associated with the growing growth-induced seed; determining a part location of the one or more of the plurality of parts of the growth-induced seed based on the classification; measuring the one or more of the plurality of parts of the growth-induced seed; measuring photosynthetic activity of the growth-induced seed; and determining whether to harvest the growth-induced seed based on one or more of the group including: at least the measurement of the part of the growth-induced seed and the photosynthetic activity measurement.

A system for producing a group of growth-induced seeds for commercial use or sale, the system including a subjecting unit configured to subject each and every seed of a seed group to a growth-inducing procedure; an monitoring unit configured to monitor the seed for a development stage associated with a specific characteristic; a determination unit configured to determine if the monitored seed has the specific characteristic based information about the monitored development stage of the seed; a separator unit configured to separate the monitored seed having the specific characteristic into the group of growth-induced seeds for commercial use or sale so that each and every seed in the group has been monitored and determined to have the specific characteristic.

A system for producing a group of germinated growth-induced seeds for commercial use or sale, the system including a subjecting unit configured to subject a seed to a growth-inducing procedure; a monitoring unit configured to monitor the subjected seed for a rate of development toward a specific characteristic, indicated by one or more of a group including: a physiological indicator associated with the specific characteristic and a morphometric indicator associated with the specific characteristic; a determining unit configured to determine if the rate of development toward the specific characteristic is a specific rate of development toward the specific characteristic; a stopping unit configured to stop the subjected seed from further growth when the specific rate of development toward the specific characteristic is achieved; a separator unit configured to separate the seed determined as having the specific rate of development into the group of growth-induced seeds for commercial use or sale so that each and every seed in the group has been monitored and determined to have a rate of development similar to the specific rate of development.

A system for producing a group of growth-induced seeds for commercial use or sale, the system including a spectral image acquiring unit configured to acquire a spectral image of a seed growing in a location; an image comparison unit configured to compare the spectral image with classification data; a classification assignment unit configured to assign a classification to the growing growth-induced seed according to one or more of a plurality of parts associated with the growing growth-induced seed; a seed part location determination unit configured to determine a part location of one or more of a plurality of parts associated with the growing growth-induced seed; a measuring unit configured to measure one or more of a plurality of parts associated with the growing growth-induced seed; a photosynthesis measuring unit configured to measure photosynthetic activity of the growing growth-induced seed; a determination unit configured to determine whether to harvest the growth-induced seed based on the measurement of the one or more of the group including: at least the measurement of the part of the growth-induced seed and the photosynthetic activity measurement.

A system for producing a group of growth-induced seeds for commercial use or sale, the system including means for subjecting each and every seed of a seed group to a growth-inducing environment; means for monitoring the seed for a development stage associated with a specific characteristic; means for automatically determining if the monitored seed has a specific characteristic based on information about the monitored development stage of the seed; means for separating the seeds having the specific characteristic into a group of monitored seeds; and means for transferring at least a portion of a plurality of separated seeds into the group of growth-induced seeds for commercial use or sale so that each and every seed in the group has been monitored and determined to have the specific characteristic.

A system for producing a group of growth-induced seeds for commercial use or sale, the system including means for subjecting a seed to a growth-inducing procedure; means for monitoring the subjected seed for a rate of development toward a specific characteristic, indicated by one or more of a group including: a physiological indicator associated with the specific characteristic and a morphometric indicator associated with the specific characteristic; means for determining if the rate of development is a specific rate of development toward the specific characteristic; means for stopping subjecting the seed from more subjecting of the growth-inducing procedure when the specific rate of development is achieved; means for preserving the seed determined as having the specific rate of development; and means for separating the seed determined as having the specific rate of development toward the specific characteristic into the group of growth-induced seeds for commercial use or sale so that each and every seed in the group has been monitored and determined to have a rate of development similar to the specific rate of development.

A system for producing a group of growth-induced seeds for commercial use or sale, the system including means for acquiring a spectral image of a growth-induced seed growing in a location; means for comparing the spectral image with classification data; means for assigning a classification to the growth-induced seed according to one or more of a plurality of parts associated with the growing growth-induced seed; means for determining a part location of the one or more of the plurality of parts of the growth-induced seed based on the classification; means for measuring the one or more of the plurality of parts of the growth-induced seed; means for measuring photosynthetic activity of the growth-induced seed; means for determining whether to harvest the growth-induced seed based on the measurement of the one or more of the group including: at least the measurement of the part of the growth-induced seed and the photosynthetic activity measurement.

DESCRIPTION OF THE DRAWINGS

FIG. 1A is a flow diagram of a method used by the background art to classify a package of seeds for commercial sale;

FIG. 1B is a flow diagram of a method used by the background art to produce a tray of growing plants from a group of seeds;

FIG. 2 is an exemplary flow diagram of a method of repeatedly monitoring and separating a seed for classification;

FIG. 10 is an example comparison table of the example method of FIG. 3 versus human evaluation of an individual seed germinating;

FIG. 11 is a table of an example of the raw data used in the comparison of FIG. 10 and showing how a seed is repeatedly tested;

DETAILED DESCRIPTION

Figure 3:
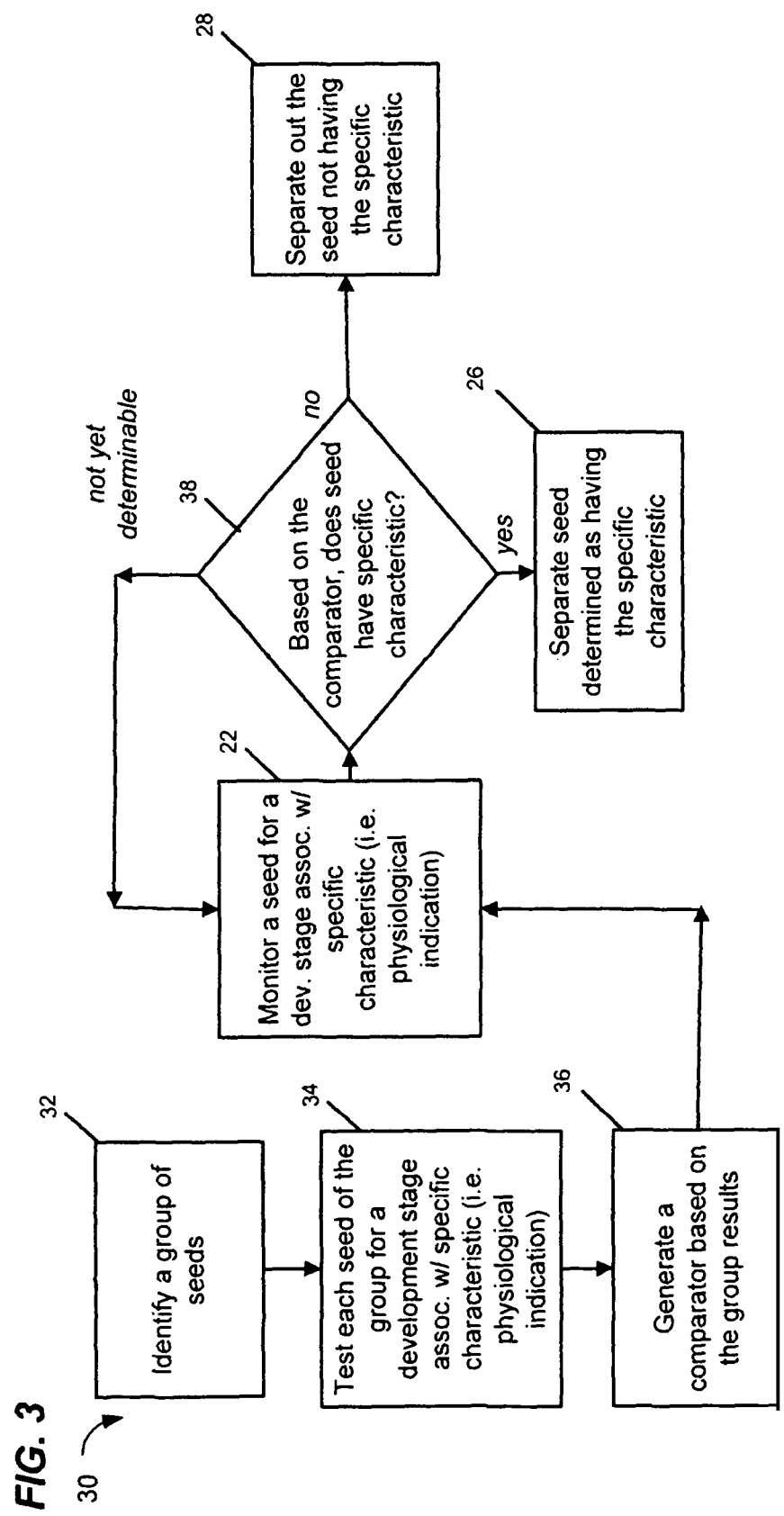
FIG. 3 is another exemplary flow diagram of a method of monitoring and separating individual seeds for classification based on the results of a previously tested group of seeds.

It is evident to one of ordinary skill in the art that the present disclosure is not limited as to the type of individual monitoring and determination used in generating the resultant commercial group of seeds where each seed was subjected to imbibition-induced or growth-induced development, and further that each and every seed in the group has been monitored and determined whether it has a specific characteristic. The specific characteristic which is to be monitored and determined may be any commercially desirable specific characteristic that such a growth-induced seed could have or grow to have, such as a seed likely to grow in suboptimal climates, a seed with a specific rate of development, a seed with early germination, a seed having a particular population statistic, a seed that grows in a particular climate, a seed that reacts better to stresses, a seed that has a specific vigor rating, a seed with a particular photosynthetic activity, a seed that has obtained a certain stage of development or rate of development of the specific characteristic.

In monitoring and determining whether a growth-induced seed has the specific characteristics many types of monitoring and determining techniques may be applied in the embodiments described herein. Listed below are examples of the different monitoring and determining procedures and devices (including tests, analysis, measurements, data gathering, data processing) which may be used with the embodiments disclosed herein.

For example, technology including the imaging technology described in U.S. Pat. No. 5,659,623, entitled "Method and Apparatus for Assessing the Quality of a Seed Lot," issued on Aug. 19, 1997; U.S. Pat. No. 5,901,237, entitled "Method and Apparatus for Assessing the Quality of a Seed Lot," issued on May 4, 1999; and U.S. Pat. No. 6,236,739 entitled "Method for Determining Seedling Quality," issued on May 22, 2001, all of which are owned by the assignee of the present application, are hereby incorporated by reference herein in their entirety as a description of an example of the related art and imaging technology which may be used in the monitoring and determining of a specific characteristic.

For ease of reading, this disclosure uses the term "growth-induced seed" to indicate a seed which has been subjected to imbibition so that it may develop further, or in other words, a seed manifesting imbibition-induced development, which is as one of ordinary skill in the art would phrase such a seed.

Herein, the term "monitoring," and all its variations, is intended to include testing, measuring, gathering data, processing data, and analyzing data according to a specific requirement to be able to provide data associated with the specific characteristic. The term "comparator" includes a comparator value, range of values, statistical analysis, statistical ranges, statistical requirements, and any other requirement. The term "requirement" which is associated with a specific characteristic also includes any general requirement, statement, script, or algorithm which could be implemented by a computer in order to be able to determine whether a specific characteristic is met by a monitored growth-induced seed.

After the individual growth-induced seed is monitored and determined to have a sought after specific characteristic, this seed may then be separated into a group of similarly selected growth-induced seeds for further commercial use or sale, which includes one or more of a group including a package, a plurality of germinated seeds, a plurality of seedlings, a plurality of young plants, a well plate including a plurality of germinated seeds, a seedling growing tray including a plurality of seedlings, a plurality of cells of a seedling growing tray, a plurality of plugs. The term "one or more of a group including A and B" is intended to describe all possible combinations of A and B, also including combinations of multiples of A and B, so that the following combinations are at least included: AA, BB, AB, A, B.

Other examples of the disclosed embodiments including subjecting a seed to a growth-inducing procedure, monitoring for a development stage, development rate or any comparator or requirement indicative of the specific characteristic, determining whether such stage or development rate or range of values indicative of the specific characteristic has been reached, spectral image acquisition, separating such seed determined to have the specific characteristic, stopping the subjecting of the growth-inducing environment, transferring, preserving, and sorting of such seeds identified to have the specific characteristic are described herein. However, these embodiments are not intended to be all inclusive, but rather exemplary. It is evident to one of ordinary skill in the art that the examples herein are descriptive and not exhaustive. All equivalents at the time the disclosure was made are intended to be covered by the claims despite the explicit inclusion not being stated due to practical considerations.

Additionally, the terms "growth-induced seed," "seed manifesting imbibition-induced development," "imbibed seed," "germinated seed," "seed," "seed going through the germination process," "seedling," "small plant," and "plant" are interchangeable throughout this document, and as such are intended to have the meaning which includes all of the stages included by these terms, as these terms are used broadly and intended to include a seed as it goes through all the stages of the growth process on to the development into a young plant. The term "germination" has disputable meaning in this field of technology. For clarity, "germination" as used herein includes imbibing or inducing growth of a seed on through to where the seed becomes a seedling or small plant. The term "growth-induced seed" is used to represent all the definitions entitled to the above list of terms. Not every seed which is imbibed or growth-induced ends up growing. However, the mere act of imbibing or attempting to cause growth acted upon a seed will cause the seed to be referenced as a "growth-induced seed," "imbibed seed," "germinated seed," "seed," "seed going through the germination process," "seedling," and "small plant" throughout this document as it is not known which seed will indeed grow, although it is assumed some seeds will grow.

In one embodiment, the specific characteristic may be vigor based on germination testing. However, one of ordinary skill in the art will appreciate the other specific characteristics beneficial in the commercial use or sale of a group of individually tested growth-induced seeds and will understand that any specific characteristic is covered by the scope of the claims explicitly.

After one or more specific characteristics are identified, monitoring (testing, measuring, gathering data, processing data, and analyzing data) and determining for the specific characteristic is performed. The testing of each and every growth-induced seed may also be done so the determination of whether a seed has the specific characteristic may be determined at any stage, rate of development, or state toward or of the specific characteristic. For example, monitoring and determining whether a seed will germinate is a specific characteristic for which early indication is beneficial.

For example, testing of a seed for a specific stage and/or rate of development toward germination is done by subjecting the seed to a growth-inducing environment. The seed may grow and the seed may be stopped from further growth in order to preserve the germinated seed in its present particular state. After a plurality of seeds has been similarly subjected to growth or imbibition, monitored, and determined to have reached a similar stage and/or rate of development, each seed can be preserved at the similar stage and/or rate of development. Thus, a plurality of seeds can be used and sold commercially as having a similar stage and/or rate of development toward a specific characteristic, such as germination. Thus, the grouped seeds are said to be "synchronized" or having a similar stage and/or rate of development.

In other words, growth-induced seeds may have a different rate of growth (including imbibition induced development) into a plant. Testing for a specific stage and/or rate of development will allow for a plurality of seeds that grow at a different rate to be stopped from further growth-induction or slowed from further growth. Stopping or slowing the seed from further growth is done when each seed is determined to have a similar stage and/or rate of development toward growth or maturation. This way a group of seeds, after having been individually tested, can be synchronized for a particular stage and/or rate of development. A group of seeds with such synchronization is desirous for commercial use or sale.

Alternatively stated, a group of individual seeds in a population may be simultaneously subjected to growth-induction, but not every seed will develop into a normal seedling. Further, not every seed will proceed through the developmental processes at the same rate. The result of these different development rates is a population of seedlings at different stage and/or rates of development, or a "non-uniform" seed group. By monitoring the physiological and/or morphological or pluralities of such changes associated with the growth process of each seed, it is possible to classify each seed as to its stage and/or rate of development.

A requirement may be specified so that the sought after characteristic is more easily discernable. For example, there may be no easily identifiable single value to use while monitoring the growth-induced seed and determining if the seed has the specific characteristic. In such case, a requirement may be set forth, such as identifying all the seeds that fall within a specified range or grouping. Such range or grouping may be, for example, described by using population statistics. For example, all seeds determined to not be the fastest 10% and the slowest 25% of development as identified by, for example, oxygen consumption analysis, may be determined as having the specific characteristic. Details of this requirement are presented below Further, for those individual seeds developing more quickly than the median for the population or some other requirement, it is possible to slow their development by subjecting these individual seeds to a lowering of temperature, and/or an other environmental condition or stress which would slow the growth, and/or selectively applying plant growth regulators, or limiting water to create osmotic stress in order to preserve the seeds at a similar state, stage, and/or rate of development despite the seeds having different growth rates up until that point. Other growth regulators include a temperature in the range of 0 to 5° C., or a chemical growth regulator which is one or more of a group including ancymidol, chlormequat chloride, daminozide, paclobutrazol, and uniconazole.

FIG. 1A shows the method 10 that is used by the background art. In order to classify a group of seeds, such as an entire seed group, as having a desired specific characteristic, such as seed vigor, the background art takes a sample group of the seeds from the seed group (block 12) and tests the seeds of that sample group only for the desired characteristic (block 14). The result of the sample testing is then used to classify the entire seed group (block 16) from which the sample group was taken. The resultant package of seeds characterized from this method (block 18) would have a probability of having the identified classification. Thereafter, the seeds of the group of seeds are packaged with the classification based on the classification of the sample group (block 18).

FIG. 1B shows a flow diagram of another background art method 11, commonly known as "gap filling" or "gapping up" a tray of seedlings, which is used to produce a seedling tray with higher-performing young plants. First, a group of seeds are selected to be sowed into a plurality of cells that make up a tray (block 70). The seeds in the cells are grown in the tray until leaves are generated (block 72). An imaging device takes a spectral image of the tray and its contents (block 74). Measurements are taken of the leaf surface area (block 76). Gaps in the tray are detected (block 77). The plants identified as being associated with the gaps are removed from the cell of the tray (block 78). The empty cells of the tray are then replaced with a plant that is of an adequate development (block 79) so the tray is filled with plants which have reached a more common development stage.

Current practice for young plant producers calls for "full trays." If 100 trays of 100 plants/tray are required to be sold, the young plant producer may sow 125 trays and find he has 80 plants in each tray. At a point in time during the growing cycle, typically when cotyledons are fully expanded, equipment is used to pull plants from "source trays" and fill in gaps in "destination trays." Equipment typically consists of (1) an imaging system which identifies cells with missing plants in the destination trays and good plants in the source trays, (2) a bottom dislodger which pushes media, or media and seedling, up through an opening in the bottom of a cell, (3) a gripper which holds and pulls the dislodged media and seedling and releases the media and seedling into a empty cell in the destination tray, and associated (4) tray indexing, dislodger and gripper movement mechanics.

None of the background art tests an individual growth-induced seed in order to classify a group of seeds. For example, the background art does not test each individual growth-induced seed before sowing the seed into the cell of the plant tray. Thus, the background art is not able to generate a higher yielding seedling or plant tray earlier in the process of production of the plant tray. Embodiments of the present disclosure test each individual growth-induced seed at an earlier time, well before sowing the seed into the cell of the seedling or plant tray.

Another problem with the background art is that the background art performs one test to test a plurality of seeds in order to determine which cells of the tray need to be replaced. The background art does not test a single growth-induced seed, much less take repeated measurements of the single seed. Embodiments of the present disclosure test a single growth-induced seed and take repeated measurements of the single seed.

Further, the background art does not combine multiple different types of tests to test an individual growth-induced seed. The background art does not take more than one type of measurement in monitoring for a specific characteristic. For example, the background art only measures the surface area of the cotyledons or leaves and does not combine this measurement with a different measurement, such as a physiological measurement of a metabolic measurement of oxygen consumption or another morphometric measurement, to determine based on the combination of these measurements which cell area of the tray holds a deficient seed. Embodiments of the present disclosure combine multiple different types of measurements and tests to monitor and determine whether an individual seed has a specific characteristic or a plurality of specific characteristics. Embodiments of the present disclosure include testing for any combination of a morphometric and/or a physiological changes or rates of change.

Further, the background art takes only a one-time instantaneous image or measurement, e.g. a single snapshot in time. The background art does not take repeated spectral images or repeated tests, or measurements. Embodiments of the present disclosure take repeated spectral images of the growth-induced seed and/or repeated tests and/or measurements as the seed grows.

Also, the background art looks at the size of the surface area of the roots, cotyledons, or leaves only. The background art does not take other morphometric measurements, moreover the background art does not take morphometric measurements of a single growth-induced seed in order to determine if the seed has a specific characteristic. The background art does not take morphometric measurements of, for example, seed perimeter, seed length, seed width, and other dimensions, areas, and volumes of seeds, hypocotyls, cotyledons, breaks in the seed coat, branching of roots, shedding of the seed coat, unfolding of the leaves (0-180° angle of openness of cotyledons in relation to the growing surface) of a single growth-induced seed, and any parts thereof. Embodiments of the present disclosure take morphometric measurements including cotyledon measurements and other types of seed measurements listed above, but also including other types of morphometric measurements, such as ratios, angles, statistical analysis (i.e., deviation analysis). Also, embodiments of the present disclosure take any kind of repeated measurement of a growth-induced seed in determining whether the seed has a sought after specific characteristic.

One problem with testing a seed at a time much later after germination has started is that the background art requires more physical space of the seed growing equipment to produce the same amount of plants. For example, assuming a two dimensional space measurement is taken of the source tray, which is the tray used to fill the gaps of the destination tray, the space it takes to produce the cells with gap filling is 128% of the space used to produce a yield of 80%. Whereas, embodiments of the present disclosure reduce the space required from 128% to, for example, 28% in order to yield the same 80%. This reduction is due to the earlier detection of favorable growth-induced seeds and the smaller amount of area required to work with only the smaller number of classified growth-induced seeds rather than working with all the seeds.

Another benefit of the disclosure herein is that the tests and/or measurements of the individual growth-induced seed can be done at an earlier time so that further space can be saved as these tests and/or measurements are taken before the growth-induced seed requires light. Thus, further space reduction is allowed as a 3-dimensional stacking of trays of growth-induced seeds can be used instead of the two dimensional layouts used by the background art, which required sunlight to access each individual seed at the time of testing. Embodiments of the present disclosure do not require direct sunlight as tests and measurements run as part of the embodiments of the present disclosure can be performed before the growth-induced seed requires direct sunlight.

As discussed herein, embodiments of the present disclosure generate an output of a plurality of individually tested growth-induced seeds, where each seed was determined to have a specific characteristic. Each seed may be separated in any of the following forms of output, such as, a package of germinated seeds, a tray of plants, or group of seeds, group of seedlings, plurality of germinated seeds, plurality of seedlings, plurality of young plants, a well plate including a plurality of germinated seeds, a well plate including a plurality of seedlings, a seedling growing tray including a plurality of seedlings, a plurality of cells of a seedling growing tray, and a plurality of plugs.

FIG. 2 shows a flow diagram of an exemplary method 20 of the present disclosure for generating a group of germinated seeds for commercial use or sale, including subjecting each seed to growth-inducing (block 20), monitoring the seed for a development stage associated with a specific characteristic (block 22); automatically determining if the seed has the specific characteristic (block 24); separating the monitored seed having the specific characteristic into a the group for commercial use or sale so that each and every seed in the group has been monitored and determined to have the specific characteristic (block 27). Seeds not having the specific characteristic are separated out (block 28).

A development stage (block 22) includes any type of stage, including a rate of development, that can be identified by a physiological indicator or a morphometric indicator or any combination of the two types of indicators and their pluralities. Physiological indicators are indicators of any type of mechanical, physical, and biochemical functions of a living organism, such as a growth-induced seed. Morphometric indicators are indicators of any type of change in external form of the seed.

When monitoring and determining if a seed has a specific characteristic (blocks 22, 24), an examination of the complex structures and their elements and relations (physiological and/or morphometric) is done at a single time (not shown) or repeatedly until it is determinable whether the seed has the specific characteristic. In this way, each seed can be stopped at a particular stage of growth or rate of development. Moreover, any combination of tests can be done repeatedly at the same time or at different times.

All types of comparators including a comparator value, range of values, statistical analysis, statistical ranges, statistical requirements, and any other requirement associated with monitoring and determining for a specific characteristic may be used with the embodiments described herein. For example, a comparator may be formulated by using a previous group of individually tested seeds to generate information which can be monitored for during the step of automatically determining if the monitored seed has the specific characteristic based on information about the monitored development stage of the seed.

Alternatively, information about the monitored growth-induced seed may include statistical information, such as population statistics. A growth-induced seed may be monitored and automatically determined for a specific characteristic based on a range or other requirement associated with the specific characteristic (block 24). For example, listed below in Tables 1-3 are the oxygen consumption readings of the $10^{th}$, $50^{th}$, and $100^{th}$ oxygen consumption readings for a group of growth-induced seeds. No oxygen consumption is indicated by the value More in the Bin column. Also, sensor fluctuations can result in a reading higher than 1. A reading of 1 in the Bin column indicates that oxygen consumption has begun. As oxygen is consumed the numbers move down to zero.

TABLE 1

10th oxygen reading

| Bin | Frequency |
|---|---|
| 0.35 | 0 |
| 0.4 | 0 |
| 0.45 | 0 |
| 0.5 | 0 |
| 0.55 | 0 |
| 0.6 | 0 |
| 0.65 | 0 |
| 0.7 | 0 |
| 0.75 | 0 |
| 0.8 | 0 |
| 0.85 | 0 |
| 0.9 | 0 |
| 0.95 | 13 |
| 1 | 71 |
| More | 16 |

TABLE 2

50th oxygen reading

| Bin | Frequency |
|---|---|
| 0.35 | 0 |
| 0.4 | 1 |
| 0.45 | 2 |
| 0.5 | 1 |
| 0.55 | 5 |
| 0.6 | 6 |
| 0.65 | 8 |
| 0.7 | 7 |
| 0.75 | 7 |
| 0.8 | 7 |
| 0.85 | 14 |
| 0.9 | 16 |
| 0.95 | 21 |
| 1 | 4 |
| More | 1 |

TABLE 3

100th oxygen reading

| Bin | Frequency |
|---|---|
| 0.35 | 0 |
| 0.4 | 6 |
| 0.45 | 35 |
| 0.5 | 12 |
| 0.55 | 12 |
| 0.6 | 5 |
| 0.65 | 3 |
| 0.7 | 6 |
| 0.75 | 9 |
| 0.8 | 5 |
| 0.85 | 3 |
| 0.9 | 2 |
| 0.95 | 1 |

TABLE 3-continued

100th oxygen reading

| Bin | Frequency |
|---|---|
| 1 | 0 |
| More | 1 |

In the $10^{th}$ read shown in Table 1, it is evident that the majority of seeds have not used much oxygen. However, by the $50^{th}$ read as shown in Table 2, while three groups of seeds have not used much oxygen, the rest have started to consume oxygen. Then, by the $100^{th}$ reading as shown in Table 3, the majority of seeds are indicated as having consumed a large amount of oxygen. Requirements based on population statistics, such as these described above may be used in the process of automatically determining which seeds have the specific characteristic. Here the seeds falling within the majority of oxygen consumption frequencies is the requirement or more narrowly stated range that may be monitored for in order to determined which seeds to classify as having the specific characteristic. The specific characteristic here is seeds with average or germination rates that fall within the frequency which is not in the fastest 10% of oxygen consumption and not in the slowest 25% of oxygen consumption (block 24). Monitoring and determining may be done for any other statistical requirement or range.

In the example shown in Tables 1-3, the process of determination (block 24) may further include analyzing which seeds absorb oxygen the fastest, then classifying these fastest developing seeds as seeds not to be harvested. This may be determined at the $10^{th}$ reading. At the $50^{th}$ reading, the slowest 25% of the seeds can be identified and also classified as not to be harvested. The remaining seeds may then be separated as being the seeds having the specific characteristic into a grouping of these growth-induced seeds for commercial use or sale.

Blocks which are similar between FIGS. 2 and 3 are identified with the same element identifier. Turning to FIG. 3, in determining which of the individually tested seeds has the specific characteristic, many techniques for generating a comparator including a comparator value, range of values, statistical analysis, statistical ranges, statistical requirements, and any other requirement to use in monitoring for the specific characteristic may be used. For example, to identify, at an early stage, which individual seeds are more likely to have the specific characteristic or combination of specific characteristics, a test sub-group can be taken from a seed group (block 32). Each of the seeds in the test sub-group can be tested for the specific characteristic (block 34). These results for the individual seeds of the sub-group can be used to generate a result-based comparator value for the specific or other similar characteristic (block 36), so that when a remaining seed from the group is tested for the same characteristic or a similar set of the specific characteristics, then the comparator value (block 36), can be generated and used to analyze each remaining seed individually for that specific characteristic (block 38). If the remaining seed, after being compared to the comparator value, is determined to meet the requirements so it may be classified as having the specific characteristic, then that seed is separated (block 26), and may be transferred to a separate group that is packaged as having seeds classified as meeting the requirements of the specific characteristic. Any seed not determined to have the specific characteristic is separated from the rest of the group (block 28). It is not required that a relationship exists where the seeds used to generate the comparator are from the same seed group as the later tested seeds.

In other words, after choosing one or more specific characteristics and choosing a seed for evaluation, monitoring may be done on the seed (block 22) to determine whether the individual seed has a specific characteristic so the monitored seed and other monitored seeds determined as having the specific characteristic can be grouped together for commercial use or sale purposes.

An example of how a comparator value may be generated (block 36) is explained in greater detail below with reference to FIGS. 6-11. Other examples of a comparator include requirements or ranges which may be associated with statistical analysis. Generating a comparator may include the use of one or more of a group including applying a genetic algorithm, applying statistical analysis, applying population statistics, applying fuzzy logic techniques, applying multi-variant regression techniques, and determining the best correlation between the specific characteristic and the first monitoring of the physiological indication for each and every individual seed in the first group.

In the example disclosed in FIG. 3, a sub-lot of growth-induced seeds was monitored for a specific characteristic, such as seed germination. An operator of this monitoring may use software procedures, such as the EVOLVER™ program to generate a comparator value by inputting the data of the sub-lot results and comparing this data at each time reading with how a human would judge that same seed at that specific time. Techniques, such as the EVOLVER™ program compared each seed's consumption rate with an EVOLVER™ program-selected consumption rate between the minimum and maximum. If the measured rate was greater than the selected rate, the seed was considered germinated and given a score of 1, if not greater, the seed was considered not germinated and given a score of 0. These calls were compared to human judgment. This process repeats itself, testing all measured consumption rates at each time point with a EVOLVER™-selected consumption rate, considering the seed germinated if the measured rate was greater than the selected rate, not germinated if less than the selected rate. Use of the EVOLVER™ program finds the selected consumption rate which provides the closest correlation with human judgment. Further details of this operation are listed below in the description of FIGS. 6-11.

Separating of the seeds includes the production of any type of output or grouping of the seeds that would be beneficial for commercial use or sale, such as separating the growth-induced seeds for final commercial sale, which includes producing a package of growth-induced seeds. Further, commercial use or sale of the growth-induced seeds includes any grouping of the seeds prior to final commercial sale, such as separating of the classified growth-induced seeds into a plurality of growth-induced seeds, a plurality of seedlings, a plurality of young plants, a microtiter well plate including a plurality of growth-induced seeds, a seedling growing tray including a plurality of seedlings, a plurality of cells of a seedling growing tray, and a plurality of plugs.

Separating the growth-induced seed having the specific characteristic into the group of growth-induced seeds for commercial use or sale (block 26) includes one or more of a group including planting, seeding, growing in pots, growing in trays, growing in cells, sowing outside in a field, sowing into synthetic media, arms length transfer, and sale.

For example, commercial use or sale would include a standard seed sale transaction common in the trade. Another commercial use of seed from the embodiments of the disclosure would be to use this seed for the production of plants or plant products which are sold. Plants or plant products produced from seed from the embodiments disclosed could be produced more inexpensively than from standard seed. Production of plants or plant products could be realized by sowing seeds from the embodiments of this disclosure in pots, trays, cells, synthetic media, or directly in the field.

In monitoring each seed for the specific characteristic/s (block 22, 34) any development stage or rate of development associated with the specific characteristic can be monitored, including any one or more of the group including a physiological aspect, a morphometric aspect, a combination of a physiological indication and a morphometric indication, a combination of a plurality of physiological indicators, a combination of a plurality of metamorphic indicators, and a combination of a plurality of physiological indicators and morphometric indicators. FIG. 3 shows the example where a physiological indication is tested (block 34).

It is evident that the physiological testing in FIG. 3 may be substituted for any testing of a development stage or rate of development including any combination of the following: a physiological indication, a morphometric indication, a combination of a physiological indication and a morphometric aspect, a combination of a plurality of physiological indicator, a combination of a plurality of metamorphic indicator, and a combination of a plurality of physiological indicator and morphometric indicator. Any of the described combinations of development stage testing described herein or their equivalents can be substituted for the example testing and monitoring for the physiological indication as shown in FIG. 3.

There are many physiological indicators related to seeds which may be monitored (blocks 22 and 34 of FIGS. 2 and 3), such as plant nutrition, plant hormone function; photosynthesis; respiration; tropisms, nastic movements; photoperiodism; photomorphogenesis; circadian rhythms; environmental stress physiology; dormancy and stomata function and transpiration; seed germination; metabolic signals; gas production and/or gas absorption, such as, oxygen consumption, and carbon dioxide production; enzyme activity; a breakdown of seed storage materials, near infrared spectroscopy (NIR) profiles; fundamental infrared spectroscopy profiles; a sugar measurement; a cellular breakdown; and/or any associated rate of such physiological indicator. These embodiments are described later in greater detail.

Alternatively, or in combination with physiological testing, there are many types of morphometric tests/measurements/analysis/data gathering/data processing that can also be monitored (blocks 22 and 34 of FIGS. 2 and 3), such as any morphometric stages associated with growth, which may include any of a seed coat opening to a seedling developing, germination beginning to plant development, any indication of a root, root hairs, a stem, a hypocotyl, a cotyledon, a leaf.

Figure 4:
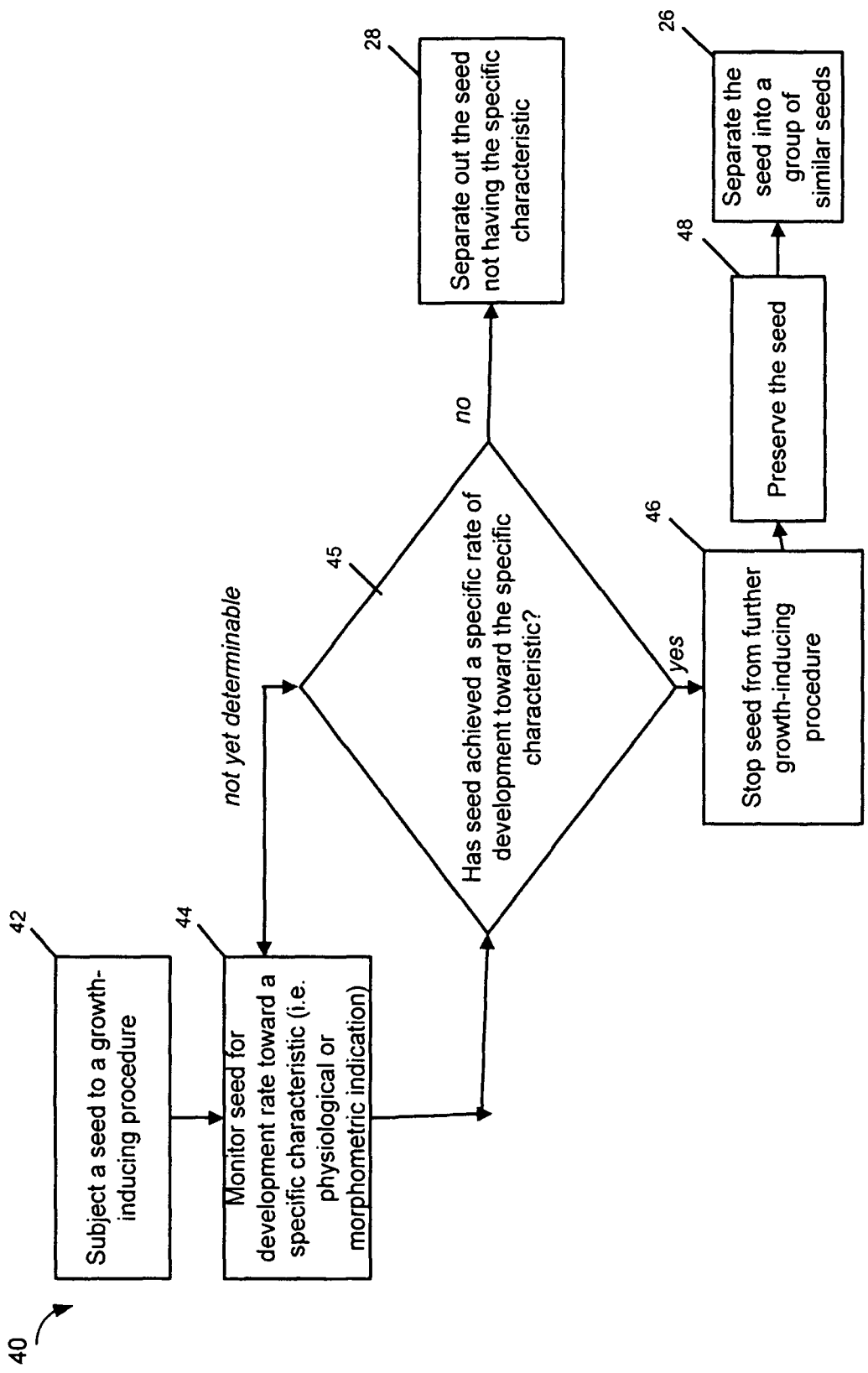
FIG. 4 is another exemplary flow diagram of a method of monitoring and separating individual seeds for commercial use or sale after the seed reaches a specified rate of development toward a specific characteristic so that a plurality of seeds can be classified as such and grouped for commercial use or sale.

Turning to FIG. 4, for example, in generating a seed group with the specific characteristic of having a high seed quality, monitoring the seeds with respect to the development stages of seed germination (blocks 42, 44, 45) may be performed as a test of the specific characteristic of seed quality. One example of monitoring for seed germination is to monitor for a physiological indication by monitoring for a metabolic indicator, such as monitoring for oxygen usage of a seed when fueling respiration towards germination (block 44).

In setting up the analysis of seed germination for each individual seed of the seed group, each and every seed is subjected to a growth-inducing environment (block 42). Depending upon which specific characteristic is tested, the environment can be changed accordingly. For example, in addition to testing for the specific characteristic of seed germination another specific characteristic, such as testing for seeds that germinate in a particular environment can be done with the embodiments described herein. For example, individual seeds may be subjected to a specific environment, (blocks 42, 21) in order to simulate real world environments by subjecting the seed to a similar temperature, oxygen, light, water, water potential, electrical conductivity, and/or other environmental conditions or stresses of the real world environment, as discussed in more detail later.

As stated above, germination can be monitored in many ways (block 44), such as by monitoring for metabolic activity, a metabolic signal, gas consumption, gas production, oxygen consumption, production of $CO_2$, enzyme activity, a breakdown of seed storage materials, near infrared spectroscopy (NIR) profiles, fundamental infrared spectroscopy profiles, a sugar measurement, and a cellular breakdown.

While, FIG. 2 described testing for a development stage, the development stage may include testing for a development rate. FIG. 4 expressly describes one embodiment where the rate of development is monitored and used in determining whether the seed has the specific characteristic.

Testing for a specific development rate is accomplished (block 45) to determine whether or not to keep subjecting the seed to the further growth-inducing procedure (block 42), or to stop subjecting the seed (block 46), or to separate the seed out as not achieving the specific rate (block 28).

If the seed is determined to have achieved the desired rate toward the specific characteristic, then the seed is stopped from further subjection (block 46) and preserved (block 48). The seed is separated into a group of similar seeds (block 26) and at least a portion of the group may be transferred for sorting for commercial use or sale as discussed above.

The disclosed embodiment includes monitoring for oxygen consumption (block 44) by use of fluorescent quenching. Other ways of testing for oxygen consumption such as chemoluminescence are also included, and some are discussed later.

Further, the embodiment shown in FIG. 4, like the other embodiments described herein, may also be combined with other tests, as discussed herein, such as other physiological tests and/or other morphometric tests and their pluralities performed at the same time or at different times. Alternatively, a combination of morphometric tests including rates of change can be done on each individual seed. Additionally, any given physiological or morphometric test or rate of change can be repeated on each individual seed at different times and compared to a value, rate, or requirement associated with the specific characteristic.

Stopping the seed from further growth inducing procedure (block 46) and preserving the seed (block 48) may be done by drying and/or by using temperature controls and/or growth inhibitors and/or regulators. Growth regulators also include limiting water by osmotic stress in order to preserve the seeds at a similar state, stage, and/or rate of development. Other growth regulators include a colder temperature, such as a temperature in the range of 0 to 5° C., or a chemical growth regulator which is one or more of a group including ancymidol, chlormequat chloride, daminozide, paclobutrazol, and uniconazole.

Figure 5:
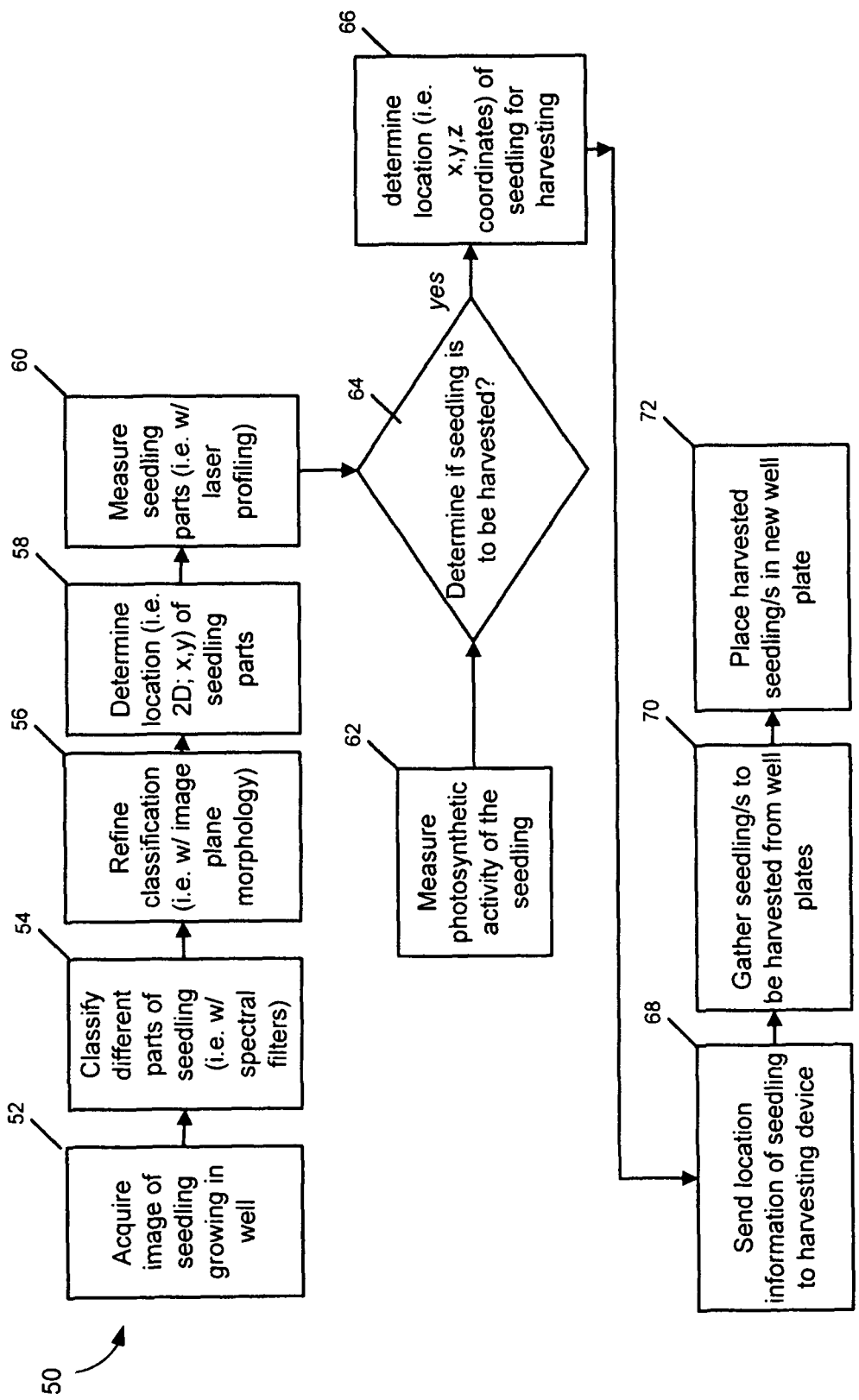
FIG. 5 is another exemplary flow diagram of a method of monitoring and separating seeds for commercial use or sale using two different analysis techniques including morphometric analysis and physiological analysis.

FIG. 5 is an example of testing an individual seed for both, a physiological indication, such as photosynthesis, and a morphometric indication, such as measuring the different physical parts of a seedling. A spectral image of a germinated seed which has reached the seedling stage is taken (block 52). Analysis of the spectral image determines the classification of the parts of the seedling. For example, spectral filters may be used to classify the parts of the seedling (block 54). The classification can be refined with, for example, image plane morphography (block 56). The method further determines the location of the seedling. For example, the location of the seedling may be determined by identifying the two dimensional x and y coordinate locations of the seedling parts (block 58). The measurements of the seedling parts are taken (block 60). The method determines if the seedling should be harvested (block 64) after measuring the photosynthetic activity of the seedling (block 62) and/or at least a measurement of one part of the seed.

Further, the seedling may be harvested immediately (not shown). Alternatively, the coordinates of the seedling to be harvested are identified in, for example, a three dimensional coordinate system (x,y,z) (block 66) so that a harvesting device can locate the seedling (block 68) and gather the seedling from the seedling tray or well plate (block 70) and place the seedling into a new seedling tray or well plate (block 72). Block 60 is an example of a morphometric test done with the aide of spectral image analysis testing (blocks 54-60) and block 62 is an example of a physiological test. These tests either individually or together may be used to determine whether to harvest the seedling (block 64).

Automated delivery systems and multiple reading and harvest cycles may be used to separate or harvest (blocks 26, 70) all seedlings from a group of seeds at the same stage or rate of development, for example when the seedlings are about 2 mm in length, or when the root growth is 10% of the length of the seed.

Once it is determined which seedlings are to be harvested (block 64), the information on x, y, and z location is transferred to a harvesting procedure (block 68). A vacuum pick up device, such as a "vacuum needle" attached to, for example, a 3 or 5 axis positioning table, is used to gather the seedlings (block 70). This separating or harvesting operation (blocks 26, 70) may be automated by having a plate stacking device deliver the plates for harvesting or the plates may be delivered manually. One plate stacking device could feed multiple harvesting systems.

For example, when separating or harvesting (blocks 26, 70), well plates are spread out over the accessible area of the table surface. The appropriate amounts of empty well plates are also added to the surface accessible by the positioning table. A computer-generated plate map is made which allows the procedure to understand the physical location of each plate, the dimensional aspects of each plate, and if it contains seeds to be harvested or is to receive harvested seeds. This is coordinated with the XYZ location of the seedlings to be harvested from each plate.

A vacuum tip then moves in the x, y, and z dimension until all the seeds of interest are separated or harvested (blocks, 26, 70). For example, it has been found that on a three axis system, harvesting seedlings from 96 well plates and delivering them into 384 well plates takes approximately 1 hour to fill the 384 well plate (block 72).

Similarly a 5 axis system is also available to separate or harvest (blocks 26, 70) the seeds determined to have the specific characteristic. For example, the Z axis is used for up and down motion to transfer the seeds between the plate with the growing seedling and the plate which will receive the seedlings. This allows for each plate to have its own independent x and y motion. If needed, 3 of the 5 axes can be run simultaneously when the vacuum needle on the z axis is clear, i.e. within the depth of a well and all 5 axes can run simultaneously when the z axis is not located within a well.

Figure 6:
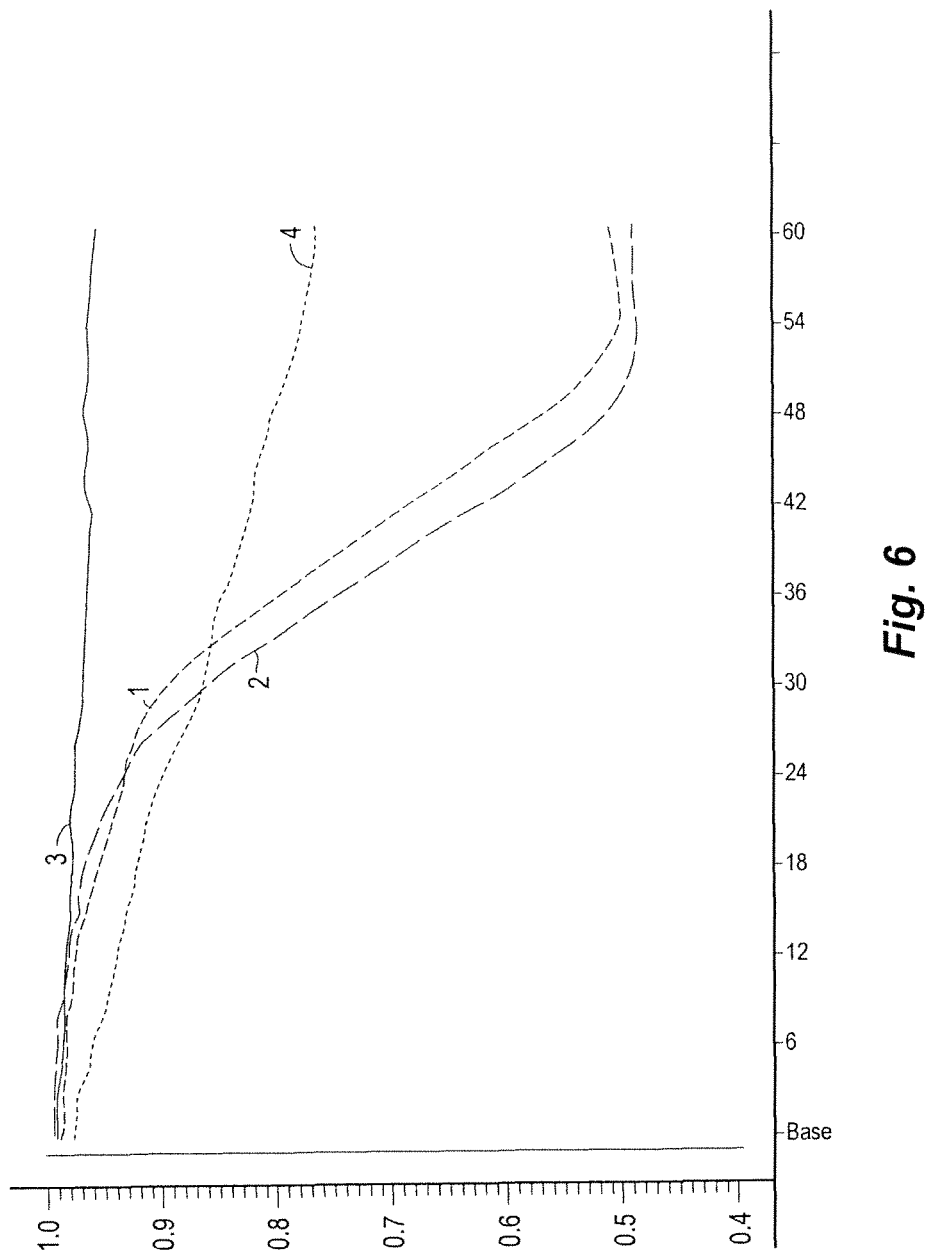
FIG. 6 is a graph of an example of a physiological test that produces a set of results of seed oxygen usage versus time of four different seeds where it is easy to see the different slope of oxygen consumption over time per seed.

FIG. 6 illustrates a more detailed example of how a comparator value for testing a specific characteristic may be generated (block 36) in any method described herein. FIG. 6 illustrates the signal strength of the oxygen concentration test results of four seeds plotted against time. These four seeds are an example of a group of seeds used in method 30 (block 34). Oxygen concentration can be measured by, for example, making optical readings of fluorescent quenching of a fluorescent dye. FIG. 6 illustrates the resultant plots of example seeds 1 and 2 as having a sharp change of slope occurring. Whereas, example seeds 3 and 4 have very little change in slope. Seeds 1 and 2 indicate a slope of oxygen consumption over time, which indicates germination has occurred.

Figure 7:
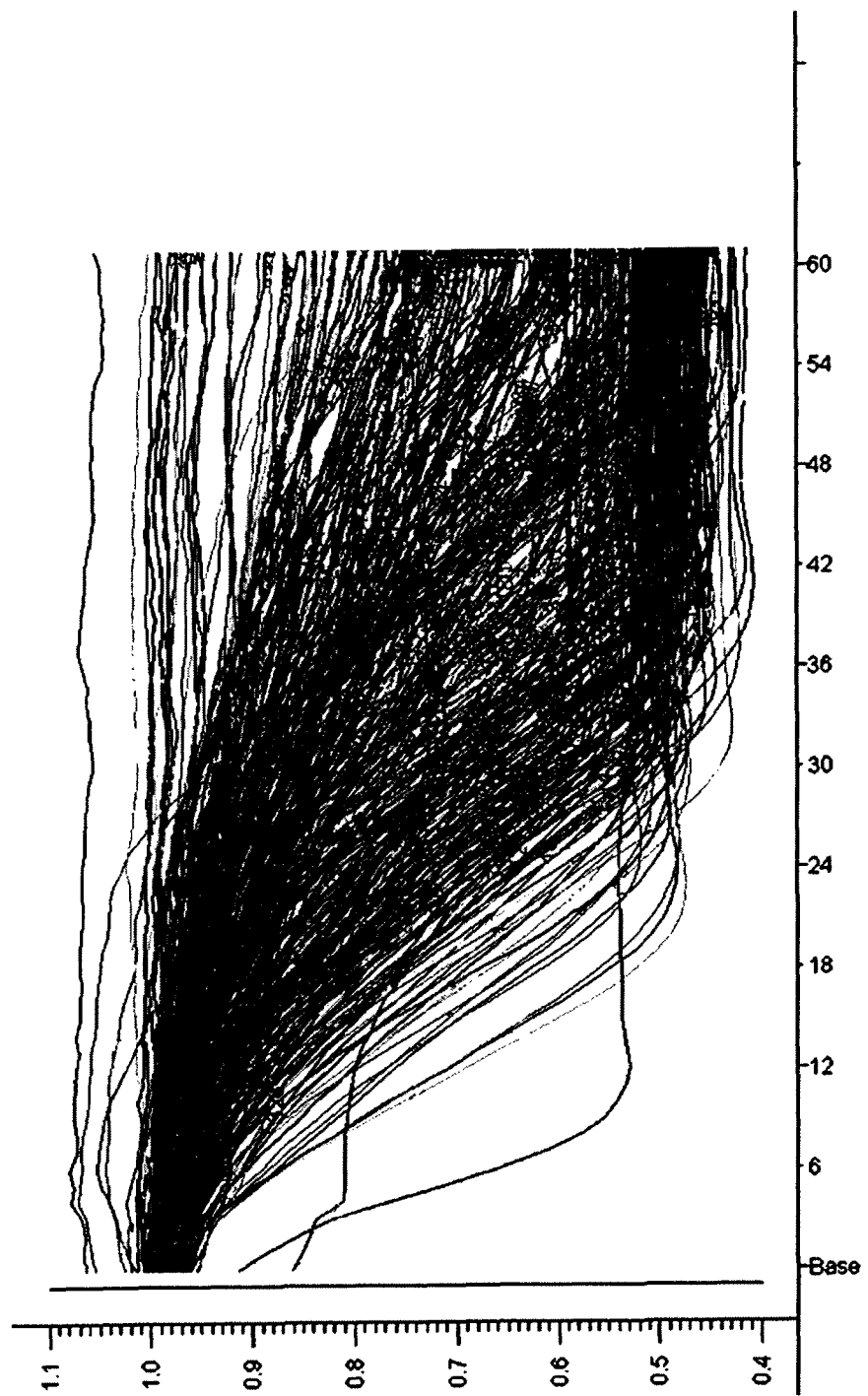
FIG. 7 is a graph of an example set of results of oxygen usage versus time of 384 seeds, which results are used to generate a result-based comparator for use in determining whether other individual seeds have a specific characteristic based on the result-based comparator

FIG. 7 shows a set of results for tests run on a larger group, for example 384 seeds and the graph that is generated by such testing of the group (block 34 from FIG. 3). From such larger data, a calibration run can be used to determine a result-based comparator value (block 36), such as what change of slope for which a similar individual seed can be expected to have a certain outcome with respect to the specific characteristic. Based on, for example, the slope results generated by the calibration run (block 36), other individual seeds can be tested (block 22), so the determination of whether the individual seed will generate a resultant plot which has a change of slope, for example, equal to or greater than the slope determined by the calibration run (result-based comparator value) as being a slope-indicating likelihood of germination or any other specific characteristic (block 38). If, for example, the individual seed does generate a resultant plot where the slope is greater than that slope determined by the calibration run (result-based comparator value) (block 26), then there is an increased probability that the seed from the group will be live and germinate.

After testing the remaining individual seeds for the slope (block 38), any seed that produces the results having the calibration run-determined slope is classified (block 26) as having the specific characteristic of likelihood of germination. Accordingly, the seed is grouped with other seeds which produce the same results so that the seed group that is generated and packaged for commercial use or sale (block 27) is one that can be identified as having a similar classification. Otherwise, the seed is separated (block 28).

Figure 8:
FIG. 8 is a graph of an example set of the results of oxygen usage versus time of another 384 seeds.

FIG. 8 shows the results of the testing of each and every seed of 384 of the remaining seeds of the larger group of seeds which included the seeds tested to generate the comparator value and the subsequently tested seeds, which were testing using that comparator. Please note that such a relationship between the seeds used to generate the comparator and the seeds tested with the comparator is not required. No relation besides that the seeds are similar enough for comparison is needed.

If the individual seed does generate a resultant plot where the slope is greater than that slope determined by the calibration run (result-based comparator value), then there is an increased chance that the seed from the group will be live and germinate. After testing the remaining individual seeds from the seed group for the slope (or any other possible generated comparator value) (block 22, 38), any seed that produces the results having the calibration run-determined slope is classified as having the specific characteristic of likelihood of germination (block 26). Accordingly, the seed is grouped with other seeds which produce the same results so that the seed group generated is one that can be identified as having seeds with a greater likelihood of germination and is then separated (block 26) and packaged for commercial use or sale (block 27).

Figure 9:
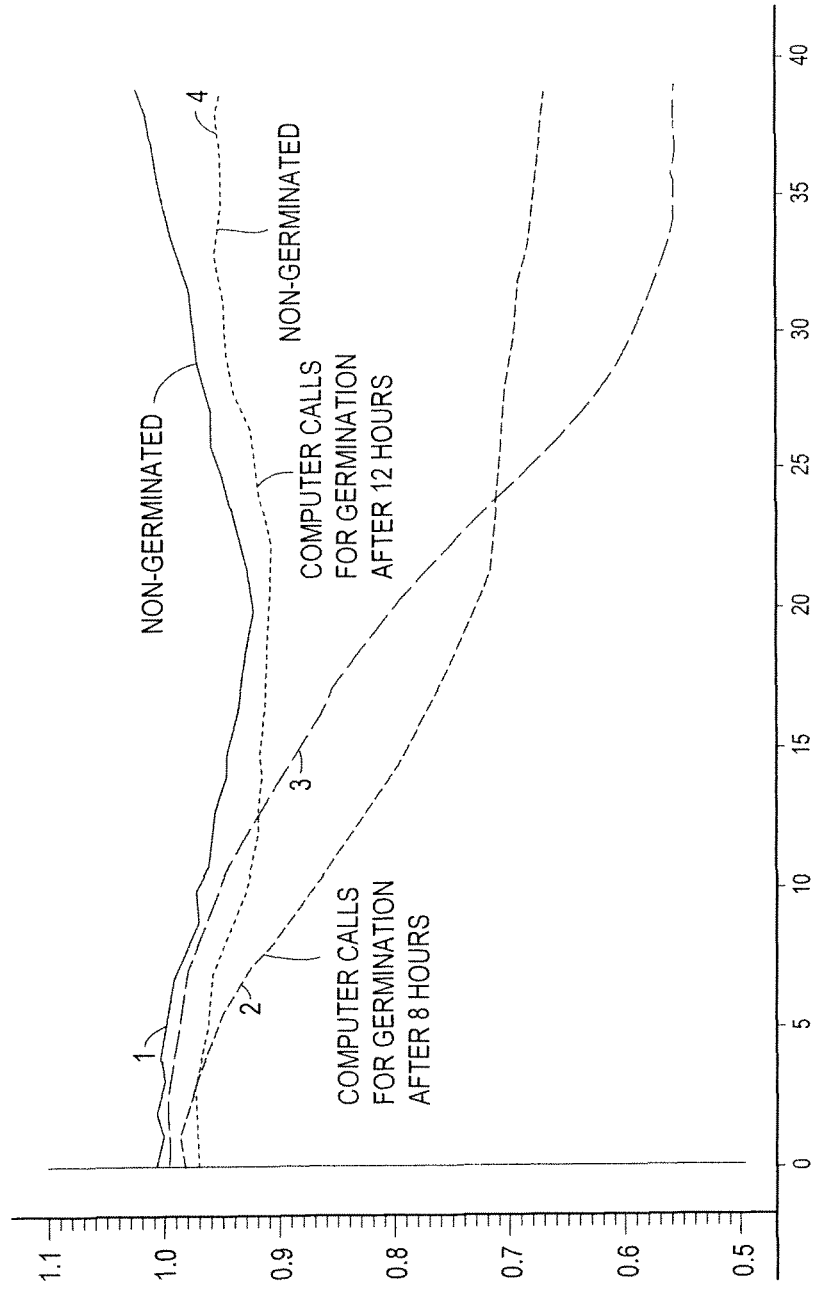
FIG. 9 is an example graph of results of oxygen usage versus time of four seeds where it is indicated at which point the determination was made that the individual seed did or did not germinate.

As shown in FIG. 9, in the present example, the calibration run generated a result-based comparator value for testing the remaining seeds of the seed group. For example, the calibration run identified that a seed that has a change of slope value of 0.0088 over a four hour period, which is an example of a rate of development, would be live and germinate. Whereas, a seed that would have a change of slope value below 0.0088 over a four-hour period would likely not germinate or would not be classified as likely to germinate or grow. These are example values only and the embodiments of the disclosure are not limited to these examples. As shown, seed 2 is determined to have germinated after eight hours. Whereas seed 1, at eight hours, was not yet determined as germinated or not germinated (block 45). Therefore, seed 1 remains subjected to the germination environment (block 42) and monitored for the metabolic activity indicative of a specific characteristic (block 44). At twelve hours, seed 1 is shown to have been determined as having achieved the specific development rate toward the specific characteristic (block 45) and then seed 1 is stopped from further subjecting (block 46). At this point the seed can be stopped from further growth (block 46) or preserved (block 48) in this state in any means of stopping or preserving available, such as by drying and/or by using temperature controls and/or growth inhibitors and/or regulators. Growth regulators may, for example, include limiting water by osmotic stress in order to preserve the seeds at a similar state, stage, and/or rate of development. Other growth regulators include a colder temperature, such as a temperature in the range of 0 to 5° C., or a chemical growth regulator which is one or more of a group including ancymidol, chlormequat chloride, daminozide, paclobutrazol, and uniconazole.

The table in FIG. 10 shows the comparison between a computer or networked system using method 30 and a human visually evaluating the same seed at the same time. A 1-1 relation indicates that the human and the method agreed the same seed would germinate. This 1-1 relation exists for 299 seeds of the 384 tested. Twenty seeds were identified by the computer as likely to germinate whereas the human judged these seeds unlikely to germinate as identified by the 1-0 relationship. There were twenty-eight seeds that were identified by the computer as not likely to germinate whereas the human judged these seeds as likely to germinate as identified by the 0-1 relationship. There were thirty-seven seeds identified by both the computer and the human as unlikely to germinate as identified by the 0-0 relationship. As seen there was very good agreement as to which seeds were predicted to germinate.

FIG. 11 shows a sample of the raw data used to in comparing the method 30 with a human. The human and the method 30 tested the seed at the same time. The "timestamp" column records the specific time when each testing by both the human and the method 30 occurred. The "samlpenum" column indicates which seed was being sampled and the "sample" column indicates the sample number of the specific seed being tested at the specified time interval. The "Real Germ" column is a record of a human person predicting germination based on visually monitoring the seed at the same time method 30 evaluates the seed. The "RealGerm" column is where the human recorded a value between 0-4 based on the human's visual monitoring. A 0 value in the "RealGerm" column indicated no germination visible; 1 indicated seed coat was just broken; 2 indicated root tip was visible; 3 indicated obvious 3 mm. elongation; and 4 indicated stem growth was visible.

As described herein, embodiments of the disclosure will generate a grouping of growth-induced seeds for commercial use or sale so that each and every seed of the grouping has been individually tested for a desired specific characteristic, such as seed germination. As can be appreciated by those of ordinary skill in the art, there are many seed characteristics, physiological indicators, morphometric indicators, tests, analysis, monitoring methods, determination methods, separation methods, and transfer methods that can be used with the embodiments disclosed herein. The following is a brief discussion of some example methods that may be used with the embodiments disclosed herein. The tests described below can be used in the subjecting of the seed to a growth-induction procedure, the monitoring of the seed for a specific characteristic, and the determining if the seed has the specific characteristic in order to produce a group of growth-induced seeds for commercial use or sale. As evident to one with ordinary skill in the art, the selection of the specific characteristic helps define the processes of subjecting of the seed to a growth-induction procedure, monitoring of the seed for a specific characteristic, and determining if the seed has the specific characteristic in order to produce a group of growth-induced seeds for commercial use or sale.

I. Specific Characteristic Example 1

Seed Vigor and Associated Tests

Biologically, seed vigor is based on the genetic constitution of seeds which establishes their maximum physiological potential based on the fact that seeds begin to deteriorate at maturity and this deterioration proceeds until all of the seed tissues are dead. The rate of deterioration, including loss of vigor, is determined not only by heredity, but also by events occurring during seed development, harvesting, conditioning, and storage.

Several categories of seed vigor tests are known and may be incorporated in any of the disclosed embodiments. These categories include: (1) seedling growth and evaluation tests (which are often referred to as "seedling vigor classification and seedling growth rate" tests); (2) stress tests; and (3) biochemical tests.

a. Vigor Determination by Seedling Growth and Evaluation Tests

Some vigor tests are conducted under the same conditions as a standard germination test, except seedling growth or morphology is measured or evaluated in a different way. Seedling growth and evaluation tests are generally inexpensive and relatively rapid. However, the drawbacks of these tests are that conditions are tough to standardize between laboratories and the seed analyst must be able to determine whether the seed has germinated.

The seedling vigor classification is similar to the standard germination test. The only difference between the two tests is that normal seedlings are further classified as "strong" or "weak." A seedling is often characterized as weak if it is missing its primary root and/or cotyledon, if its hypocotyl has breaks, lesions, necrosis, twisting or curling. In contrast, normal seedlings are characterized as "strong." Based on this test, seedlings are divided into those with deficiencies and those without deficiencies.

The seedling growth rate test involves a measurement of seedling growth. Under this test, seeds are germinated according to a standard germination test with a more specific moisture content on paper towels. At the end of the germination period, seedling growth is measured. Usually, linear growth and dry weight are determined. Seeds which produce a single straight shoot or root can be measured to determine linear growth. The seedling growth rate test suffers from four limitations: (1) the seedling measurement and the removal of cotyledons or other storage tissues prior to oven drying are relatively time consuming; (2) seedling elongation can be inherently different among cultivars; (3) rate of germination is affected by moisture and temperature; and (4) seed size affects hypocotyl growth in soybeans.

b. Vigor Determination by Stress Tests

Some of the stress tests simulate stresses which seeds encounter in the field. The theory behind a stress test is that under suboptimum or stressed conditions, high vigor seeds have a greater potential for emergence.

In the accelerated aging test, for example, seeds are placed in temperature of 40-45° C. and nearly 100% relative humidity for various lengths of time, after which a germination test is conducted. This test is relatively inexpensive.

The cold test simulates early spring field conditions by providing high soil moisture and low soil temperature. Typically, seeds are placed in soil in a plastic box or in paper towels lined with soil and incubated at 10° C. for a specified period. At the end of the cold period, the tests are transferred to a favorable temperature for germination. The emergence percentage is considered as an indication of seed vigor. However, one problem with the cold test is microorganisms. Microorganisms frequently cause seed decay, fungus and other problems. In addition, specific soil conditions are often difficult to standardize from laboratory to laboratory.

The cool germination test involves germinating seeds in darkness at constantly low temperatures, such as 18° C. for several days. Basically, this test is a type of seed exhaustion test. This test is also referred to as the slant board test, which has been used to predict the field vigor in lettuce, carrots, cauliflower seeds and cotton. See O. E. Smith et al., "Studies on Lettuce Seed Quality: I. Effect of Seed Size and Weight on Vigor," J. Amer. Soc. Hort. Sci. 98(b): 529-533 (1973). McCormac, A. C. et al., "Automated Vigour Testing of Field Vegetables Using Image Analysis," Seed Sci. and Technol. 18: 103-112 (1990).

c. Vigor Determination by Biochemical Tests

Biochemical tests measure certain metabolic events in seeds that are associated with germination and can be used to assess vigor. These tests include, for example, the biochemical tests described herein.

The tetrazolium test measures dehydrogenase enzyme activity. These enzymes reduce tetrazolium chloride salt, which is colorless, to form a water insoluble red compound, formazan, which "stains" living cells a red color. The dead cells remain colorless. See the Seed Vigor Testing Handbook Prepared by the Seed Test Committee of the Association of Official Seed Analysts (1983).

Conductivity tests involve measuring soak water conductivity. Low vigor seeds often have poor membrane structure and often leak. Seeds with such a poor membrane structure frequently lose electrolytes, such as amino acids and organic acids, when they imbibe water, thereby increasing the conductivity of the soak water.

d. Vigor Determination by Image Analysis Tests

The tests described herein may be incorporated into any of the disclosed embodiments. For example, the processes of monitoring the seed for a specific characteristic and determining if the seed has the specific characteristic in order to produce a group of growth-induced seeds for commercial use or sale may include, for example, the spectral image analysis tests described below.

Image Analysis, which is also known as "Machine Vision," is a computer based system that is used in the plant industry. The most common components of an image analysis system are a camera, a frame-grabber to digitize the analogue image and store it in RAM, a computer to run image-processing, image analysis classification and user access software, and data output hardware such as a monitor and printer. See Draper, S. R. et al., "Machine Vision for the Characterization and Identification of Cultivars", Plant Varieties and Seeds 2: 53-62 (1989). Image analysis provides a new way of studying and monitoring plants and seeds. For example, image analysis is used to analyze and record the shape of plant organs and seeds. Draper, S. R. et al., "Preliminary Observations with a Computer Based System for Analysis of the Shape of Seeds and Vegetative Structures," J. Nata. Inst. Agric. Bot. 36: 387-395 (1984). Travis, A. J. et al., "A Computer Based System for the Recognition of Seed Shape," Seed Sci. & Technol. 13: 813-820 (1985). Image analysis is also used to determine the shape and size of plants in order to help classify, characterize, identify, and register new plant varieties. See Keefe, P. D. et al., "An Automated Machine Vision System for the Morphometry of New Cultivars and Plant Gene Bank Accessions"; Draper, S. R. et al, "Machine Vision for the Characterization and Identification of Cultivars," Plant Varieties and Seeds 2: 53-62 (1989).

Image analysis is also used in the monitoring and determining processes described above including growth testing, vigor testing, and germination testing. Image analysis has been used to measure the results of the slant board test, the accelerated aging test and the cold test. See Keys, R. D. et al., "Automated Seedling Length Measurement for Germination/Vigor Estimation Using ACASAS (Computerized Automated Seed Analysis System)," J. of Seed Technol. 9: 40-53 (1984). McCormac, A. C. et al., "Cauliflower (*Brassica oleracea* L.) Seed Vigour: Imbibition Effects," J. of Exp. Bot. 41: 893-899 (1990); McCormac, A. C. et al., "Automated Vigor Testing of Field Vegetables Using Image Analysis," Seed Sci. & Technol. 18: 103-112 (1990).

Additional image analysis testing is described in U.S. Pat. No. 5,659,623, entitled "Method and Apparatus for Assessing the Quality of a Seed Lot," issued on Aug. 19, 1997; U.S. Pat. No. 5,901,237, entitled "Method and Apparatus for Assessing the Quality of a Seed Lot," issued on May 4, 1999; and U.S. Pat. No. 6,236,739 entitled "Method for Determining Seedling Quality," issued on May 22, 2001, all of which are owned by the assignee of the present application, and are hereby incorporated by reference herein in their entirety as a description of an example of the related art and imaging technology which may be used in analysis of a specific characteristic.

Further, spectral image analysis is used to monitor and determining if a growth induced seed has a specific characteristic by measuring, analyzing, and testing morphometric information and/or physiological information of a seed or seeds that are growing. For example, as a seed coat opens, spectral image analysis may be used to determine the seed coat opening, radicle indication, root growth indication, hypocotytl indication, cotyledon indication, epicotyl indication, leaf indication, apical meristem indication, withered cotyledon indication, any indication of growth between imbibition and plant development, branching of roots, shedding of the seed coat, unfolding of the leaves (0-180° angle of openness of cotyledons in relation to the growing surface) of a single germinated seed, and any parts thereof.

II. Specific Characteristic Example 2

Germination

As discussed herein, germination testing is commonly conducted to determine seed quality. Germination includes the emergence and development from the seed embryo of those essential structures, which, for the kinds of seed in question, are indicative of the ability to produce a normal plant under favorable conditions. Other definitions of germination are also included in the present embodiments. Germination test results establish the maximum plant producing potential of seed groups and correlate quite well with emergence under favorable field conditions.

Presently, the germination test is the principal and accepted criterion for determining seed viability. The test results are typically obtained from seeds which have been placed under favorable germination conditions. Essentially, germination tests are made on artificial, standardized, essentially sterile media, in humidified, temperature controlled germinators for periods sufficiently long to permit seeds including "weak" seeds to germinate.

a. Germination, Monitoring and Determination by Measuring Metabolic Rate Changes An example of monitoring and determining for metabolic activity is described below. The extent to which germination has progressed can be determined roughly by measuring the metabolic activity of an organism usually done by testing for water uptake or respiration. The present disclosure is designed to include other tests for measuring the underlying metabolic activity of an organism. Other tests measure oxygen or other metabolic gasses in liquid or gas media. When measuring gases in liquid, gas contents are often measured by flushing some liquid through an electro-chemical measurement device. Whereas, when measuring a gas media, the analysis is done with gas-chromatography.

To help maintain the integrity of the test, confined containers are used when measuring gases. It is appreciated by one of ordinary skill in the art that many types of probes or markers can be used to test for germination or any other specific seed characteristic. Other probes used for testing germination include testing for other gases; liquids; fluorescence; chemoluminescence; enzyme activity; breakdown of seed storage materials; sugar measuring; cellular breakdown; other metabolic testing; uptake or release of metabolic gasses, such as oxygen and carbon dioxide, nitric oxide, nitric dioxide, dinitric oxide, ethylene and ethanol; and flushing some liquid through an electrochemical measurement device.

One example of testing for oxygen consumption includes placing a seed in a container and inducing germination by adding water. The seed will start to consume oxygen and produce carbon-dioxide. An optical method can be used to test the oxygen levels in the container. Oxygen testing based on fluorescence quenching of fluorescent compounds by oxygen can be used to determine the oxygen levels inside a container and continuous subsequent tests can be taken to generate the raw data used in producing the oxygen consumption curves as is shown in FIGS. 6-9.

Oxygen sensitive dyes include dyes such as a ruthenium bipyridyl complex, or Tris-Ru$^{2+}$4,7biphenyl1,10phenantrolin; or another Ru(ruthenium)-complex, or another organo-metal complex, such as an Os-complex. Other gases such as carbon-dioxide may be measured by using a Pt-complex. Other gasses such as $CO$, $NO$, $NO_2$, $N_2O$, ethylene or ethanol, can be measured using suitable sensitive organo-metal dyes, such as tris[2-(2-pyrazinyl)thiazole]ruthenium II (5).

Other oxygen sensing techniques measure for oxygen using fluorescence quenching of a metal organic fluorescent dye. The dye is excited by a laser pulse. Then the dye emits a fluorescent light which has a decay curve that is used to determine the oxygen concentration in the container. The process behind this phenomenon is called dynamic quenching.

Other methods of measuring oxygen concentration can be done by measuring the fluorescence lifetime along with the Stern Volmer equation (1) $\tau_0/\tau = 1 + C_{SV}*[O_2]$, where $\tau_0$ is the fluorescence lifetime at quencher ($O_2$) concentration zero, $\tau$ is the fluorescence lifetime at a specific quencher ($O_2$) concentration. $C_{SV}$ is the Stern-Volmer constant and $[O_2]$ is the gas concentration.

Another way to measure for oxygen concentration is by measuring the fluorescence intensity. To measure fluorescence intensity a fluorescent compound is excited by a continuously radiating light source and then the fluorescence intensity is measured. The more oxygen present the less fluorescence. The relation between the oxygen concentration and the intensity is given by the Stern Volmer equation (2) $2 I_0 / I = 1 + C_{SV}*[O_2]$, where $I_0$ is the fluorescence intensity at quencher ($O_2$) concentration zero, I is the fluorescence intensity at a specific quencher ($O_2$) concentration. $C_{SV}$ is the Stern-Volmer constant and $[O_2]$ is the gas concentration.

III. Specific Characteristic Example 3

Other Characteristics and Their Tests

Other specific seed characteristics and their associated tests though not discussed herein may also be used with this disclosure. Further, multiple tests or probes may be used to test for any specific characteristic or combination of characteristics.

IV. Specific Characteristic Example 4

Specific Characteristic is to Obtain a Certain Stage of Development or Rate of Development of the Specific Characteristic Method 40 as shown in FIG. 4 describes testing a seed for a specific characteristic (block 45) and stopping the subjection of the seed to growth when a specific development rate is achieved (block 46). For example, determining whether a seed will germinate is a specific characteristic for which early indication is beneficial. A seed can be tested for early germination indications. When the seed shows an indication of early germination, that seed can be stopped from further growth (block 46) and can be preserved or dried at that state (block 48). Thus, the group of seeds will contain seeds that were determined to have reached a specific stage or rate of development toward the specific characteristic, such as germination.

For example, as discussed herein, the individual seeds that indicated a change of slope value of 0.0088 over four hours (rate of development) were determined to be live and likely to germinate. It may be that there is a better comparator or requirement that can be made in generating a group of seeds with the specific characteristic of early germination by being able to determine germination sooner. Also, it may be beneficial to have the seeds for sorting reach a certain stage of germination or rate of germination, or any other specific characteristic, prior to separating.

Below is a description of the stages of germination that can be monitored. The rates of development toward those stages or toward the sought after specific characteristic can also be monitored. After a seed reaches a particular stage or rate, then the seed may be stopped from further growth or slowed from further growth, and preserved by growth inhibitors and/or regulators, such as drying, lowering temperatures, or administering growth regulators. (blocks 46, 48). The preserved seed may be separated into a group of seeds (block 26) and then a portion or the entire group may be transferred to a package for commercial use or sale. Alternatively, if the seed is determined to not have the specific characteristic, the seed is separated out (block 28).

For instance, stages or rates of germination can be determined by monitoring for particular gas consumption or production patterns, such as oxygen consumption and/or carbon dioxide production. For example, oxygen consumption is considered to involve at least a couple of stages. At the onset of germination there is a sharp increase in oxygen consumption and respiration increases linearly. During the second stage of germination, oxygen consumption stabilizes and slows.

Other tests can be used to determine the following stages of germination and their corresponding rates. Phase one of germination is called Activation. Imbibition of water initiates phase one. Thereafter, activation or the synthesis of enzymes occurs. The breaking down of storage material within the seed is aided by these enzymes. The seed's storage material is broken down into simpler compounds such as sugar which is utilized by the seed embryo for germination. During respiration other enzymes are activated that start to break down sugars to produce energy needed by the developing seedling for growth. At the end of phase one, cell elongation and radicle emergence occur.

Phase two of germination is digestion and translocation. During this phase, enzymes that were activated or synthesized begin to break down storage material into simpler compounds. These compounds are then translocated to the plumate (embryo axis) and the radicle (root). The plumate grows and develops as cells elongate and divide.

Phase three of germination is seedling growth. Seedling growth can be of two types, epigeous germination or hypogeous germination. The position of the cotyledons determines the growth classification. Beans and other legumes are examples of epigeous (Latin meaning above or beyond) germination where the cotyledons are pushed above the soil surface. Whereas, in hypogeous (Latin meaning under) germination the cotyledons and most of the seed remain underground with the shoot only emerging from the soil surface.

Accordingly, tests designed to indicate specific stages as identified above can be used with the disclosure towards sorting a seed, or can be used in determining any other specific characteristic. For example, other types of tests for determining which of the monitored seeds has the specific characteristic, such as early germination or a specific stage in germination can be determined by use of a genetic algorithm, statistical analysis, regression techniques, fuzzy logic routines.

Another more detailed example of method 50 in FIG. 5 is described below. Germination seeds/seedlings may be evaluated individually using spectral image recognition software (blocks 52-58). Stage of development and time needed to reach a given stage of development may be determined for each seedling. Seedlings which have reached the same or similar stage or rate of development may be individually harvested and physically grouped together in a uniform subpopulation. Once grouped, the sorted seedlings can be delivered to a typical seedling growing tray in the greenhouse or any other type of sorting or packaging for commercial use or sale.

a. Determination of Stage of Development or Rate of Development Based on Morphology For example, seeds are sown individually into microtiter well plates. These plates on the present system can range from the industry standard 6 well to 96 well formats. It can also take readings from plug flats. A separate lens can be used with the imaging equipment to allow the equipment to handle 384 well plates, if desired.

Standard flat bottom plates are used with a filter disc placed at the bottom of each well to provide a moisture reservoir.

Between 2 and 10 uL of water is delivered into each well. Individual seeds are then placed into the cell. Lids are attached and then the plates are placed into a temperature controlled incubator to allow for the germination and growth of the seeds into seedlings. (blocks 21, 42).

Plates are then placed individually onto an imaging platform. Plates could also be placed into a plate stacker for successive delivery to the imaging platform.

A spectral image is captured from each well of the plate (blocks 52, 54, 56). Using image analysis procedures and depending on the developmental stage or rates of the seed/seedling, the coordinates of the center of the seed, root, stem, leaves, and blotter on the bottom of the well are recorded. Additional recordings are also made of the area of splits in the seed coat (exposed embryo), root lengths and areas, if root hairs are present, stem length and area, and leaf length and area (blocks 58, 60), and any parts thereof.

Additional measurements typical of image analysis can also be incorporated into the system such as the number of breaks from the root, the angle of the leaves, or more generic size, shape, or texture measurements.

Next the maximum height and the positional location of the maximum height from the top of the blotter is determined for the seed, roots, stem, and leaves (block 60). This height and positional location is recorded giving the x, y and z locations for points of interest (block 66). The height is determined, for example, by using a non-contact laser distance device.

The system is capable of other measurements but in this example is configured for the determination of the photosynthetic activity of the growing seedling (block 62). This measurement is determined at the highest point of the seedling structure in the well.

From this, additional methods group the seedlings into various stages or rates of development. As an example, seeds with roots present but no larger than 2 mm in length can be targeted for harvest (block 64). Any measured aspect of the seed, e.g. root, stem, leaf or additional measurements such as the photosynthetic activity can be used as a basis for selecting the wells to be harvested (block 64).

V. Specific Characteristic Example 5

Specific Characteristic is to Grow in a Particular Environment or Stress

As discussed herein, seed groupings or packages can be produced for commercial use or sale based on which seeds are determined to be more likely to grow or germinate in different specific environments, including less than ideal environmental conditions or environmental stresses. Test environments designed to simulate the different environmental conditions and stresses can be used to subject the seed, monitor the seed, determine, and separate which individual seeds to use or to sell in a commercial grouping classified as having the specific characteristic of growing in a specific environment or capable of growing under a specific environmental stress. The following are examples of the different environments seeds can be subjected to, and information on how these environments can be used in the processes of separating the seeds and also in the processes of subjecting the seed to a growth-inducing environment and/or environmental stress, monitoring the seed for a development stage or rate of development associated with the specific characteristic, and determining if the monitored seed has met the comparator that is used to classify the seed as having that specific characteristic, such as a seed able to grow in cool climates. Environmental factors, such as temperature, oxygen, water, and light; and their effects on seed growth, rate of development, or germination are discussed below.

a. Temperature Effects

With regard to temperature, plants can be classified generally into four different groups. The first group is cool temperature tolerant plants. Most plants native to temperate zones are cool temperature tolerant plants. These seeds can germinate at temperatures as low as 40° F. (4.5° C.) but perform better at temperatures in the range of 77 to 86 degrees F. (25-30° C.).

The second group requires cool temperatures for seed germination. Most of these seeds come from plants that originated in the Mediterranean or similar climates. These climates usually have cool moist winters and hot and dry summers. These seeds find it favorable to germinate in the winter under the cooler moist conditions. These plants have developed mechanisms that prevent their germination when soil temperatures exceed 77 degrees F. (25° C.).

The third group requires warmer temperatures for seed germination. These seeds generally require soil temperatures of 50-60° F. (10-15° C.). If placed in lower temperatures these seeds usually show signs of chilling injury which result in the seeds being chlorotic, slow growing, and having disease problems. Cotton and corn are examples of warm temperature requiring seeds.

The fourth type of plants require an alternating diurnal or daily cycle of temperatures for seed germination. These seeds require warm soil during the day and a radiant cooling of soil at night. Seeds may be subject to any of these different temperature effects. For example, a specific characteristic may be that the seed is capable of growth under very low temperature levels.

Alternatively, seeds can be separated based on being subjected, monitored, and determined as having the specific characteristic that they meet the requirements of being able to grow in less than ideal environmental conditions or stresses, for example a seed that usually requires warmer temperatures but is still capable of growing after being subjected to the stress of a cooler temperature.

b. Oxygen Effects

The amount of concentration of oxygen available to the seed affects its germination. Oxygen is required to fuel the metabolic activities required during germination. Heavy soils have less oxygen available to the seed. Clay soils or flooded conditions will reduce the amount of oxygen available to a seed. Seeds may be subject to any of these different oxygen effects. For example, a specific characteristic may be that the seed is capable of growth under very low oxygen levels.

c. Light Effects

Plants that require light in order for their seed to germinate are called epiphytes. Many epiphytes have seeds that if exposed to darkness for an extended period of time will have lost viability or cease germination.

Light may also affect physiological dormancy. These types of seeds are required to be near or on the soil surface to germinate. Lettuce and conifers are such plants that need exposure to light to germinate.

Other plants need darkness to germinate. As soil depth increases so does darkness. Desert plants such as cacti are plants adapted to germinate only in deep soil with darkness. This is because the deeper the seed is within the desert soil the closer the seed is to moisture necessary for survival.

Changes in daylight or photoperiod can also affect germination. Usually woody temperate species require particular daylight lengths for germination. Seeds may be subject to any of these different lighting effects. For example, a specific characteristic may be that the seed is capable of growth under very low lighting levels.

b. Water Effects

Some seeds/plants require more water than others. Some seeds may take in water too quickly and rot. Water uptake differs among seeds. Environments differ as to how much water is available for growth. Seeds may be subject to any of these different water effects. For example, a specific characteristic may be that the seed is capable of growth under very low water activity levels.

Specific Characteristic Example 6

Specific Characteristic is a Particular Photosynthetic Activity

Once a seedling has developed leaves another type of specific characteristic that can be monitored and determined is any type of photosynthetic activity. Photosynthesis is the process by which plants use their leaves to take in energy from sunlight to produce sugar, which cellular respiration converts into adenosine triphosphate (ATP), that is, the "fuel" used by the plant to grow. The process of photosynthesis is a complex series of chemical reactions that begins with carbon dioxide and water and ends with carbohydrates such as glucose and starch. The metabolic activity of plants enables the radiant energy of sunlight to be converted to the energy found in the chemical bonds of carbohydrates. Photosynthesis is a process during which many types of physiological indicators can be measured. Chlorophyl is the substance within seeds that is used to gather light or synthesize light during photosynthesis. Measuring photosynthetic activity and/or monitoring for a physiological indicator of a plant can be used to indicate the germinated seed's growth rate, stress tolerance, stage of development, and rate of development. For example, a pulse amplitude modulation (PAM) technique can be used to measure when the chlorophyll becomes active and starts to gather light.

A pulse amplitude modulation (PAM) technique as described in U.S. Pat. No. 6,563,122, titled "Fluorescence Detection Assembly for Determination of Significant Vegetation Parameters," issued on Nov. 25, 2003, and which is incorporated by reference herein in its entirety, is used to measure photosynthesis yield in plants. The PAM technique applies pulse-modulated measuring light for selective detection of chlorophyll fluorescence yield. The actual measurement of the photosynthetic yield is carried out by application of a saturating light pulse which briefly suppresses photochemical yield to zero and induces maximal fluorescence yield. The given photochemical yield is then calculated. There is a close correlation between the determined yield parameter and the effective quantum yield of photosynthesis in monitored leaves. The PAM technique also provides the possibility of measuring fluorescence quenching coefficients, applying continuous actinic light for measurement of induction curves (Kautsky-effect), and automatic recordings of light-saturation. These measurements are used to describe the growth (development) stage or long term stress conditions of plants.

VII. Generating the Comparator for Use with Respect to the Specific Characteristic Besides the different types of physiological and morphometric indicators, specific characteristics, and associated tests for monitoring the specific characteristics as discussed herein, there are also described herein the different types of methods that can be used in determining which of the monitored seeds have the specific characteristic including use of a genetic algorithm, statistical analysis, fuzzy logic, and regression techniques. The specific characteristic can be determined based on a specific comparator (value, range, or requirement). As discussed above, a comparator may include the use of statistical analysis, such as population statistics and any associated statistical ranges. Also, a comparator may be a requirement which includes the use of any general requirement, statement, script, or algorithm which could be implemented by a computer in order to be able to determine whether a specific characteristic is met.

As shown in FIGS. 6-9, from the plurality of the curves, using a combination of hardware and software including tools such as EXCEL® and EVOLVER®, it was determined that if the slope of the curve (signal strength over time) changed by more than 0.0088 over a four hour period, then the seed would be live and germinate. Thus, the comparator, which may be used in the methods shown in FIGS. 2-5 (blocks 24, 38, 45, 64), in this example is a curve having a change of slope of more than 0.0088.

As discussed herein, FIG. 10 shows a table comparing the herein described comparator to a human comparator. It is evident to those of ordinary skill in the art that there are many types of comparator procedures that can be used with the present disclosure. The comparator may be generated and/or improved by use of calibration, applying a genetic algorithm, taking into consideration other specific characteristics, other comparators, combining comparators, statistical analysis, multiple variant regression techniques, correlation techniques, modeling, and fuzzy logic. Data such as the data shown in FIG. 10 may also be used to generate the comparator or other requirements for meeting the specific characteristic.

VIII. Other Embodiments

Figure 12:
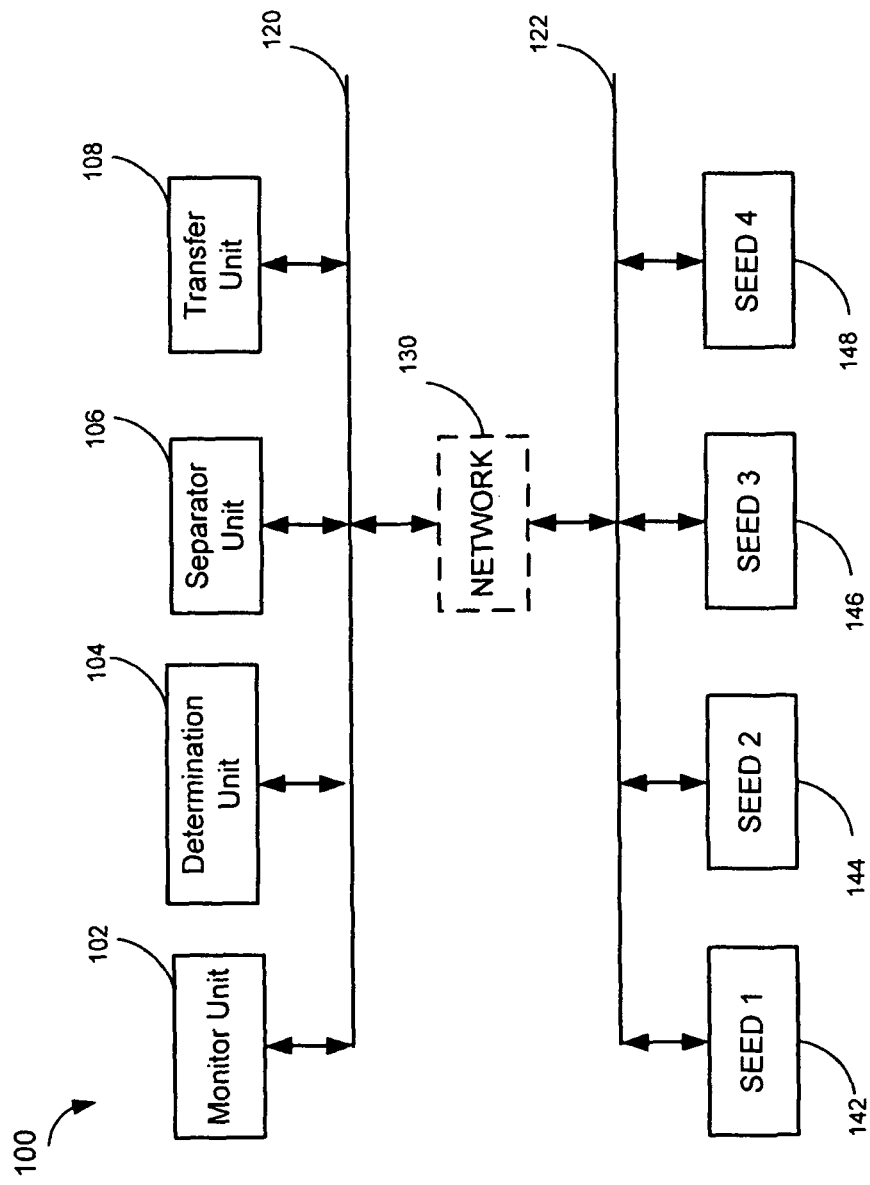
FIG. 12 is a diagram of an example of a system for monitoring and separating seeds for commercial use or sale.

The present disclosure also includes a system for producing a group of seeds for commercial use or sale. FIG. 12 illustrates an exemplary system 100 that includes: a monitoring unit 102 configured to monitor any combination of a development stage, a physiological indication, and a morphometric indication for a seed; a determination unit 104 configured to determine which of the monitored seeds have a specific characteristic; and a separator unit 106 configured to separate the monitored seed having the specific characteristic; a transfer unit 108 configured to transfer at least a portion of the separated seeds into a group for commercial use or sale so that each and every seed in the group has been monitored and determined to have the specific characteristic.

Figure 13:
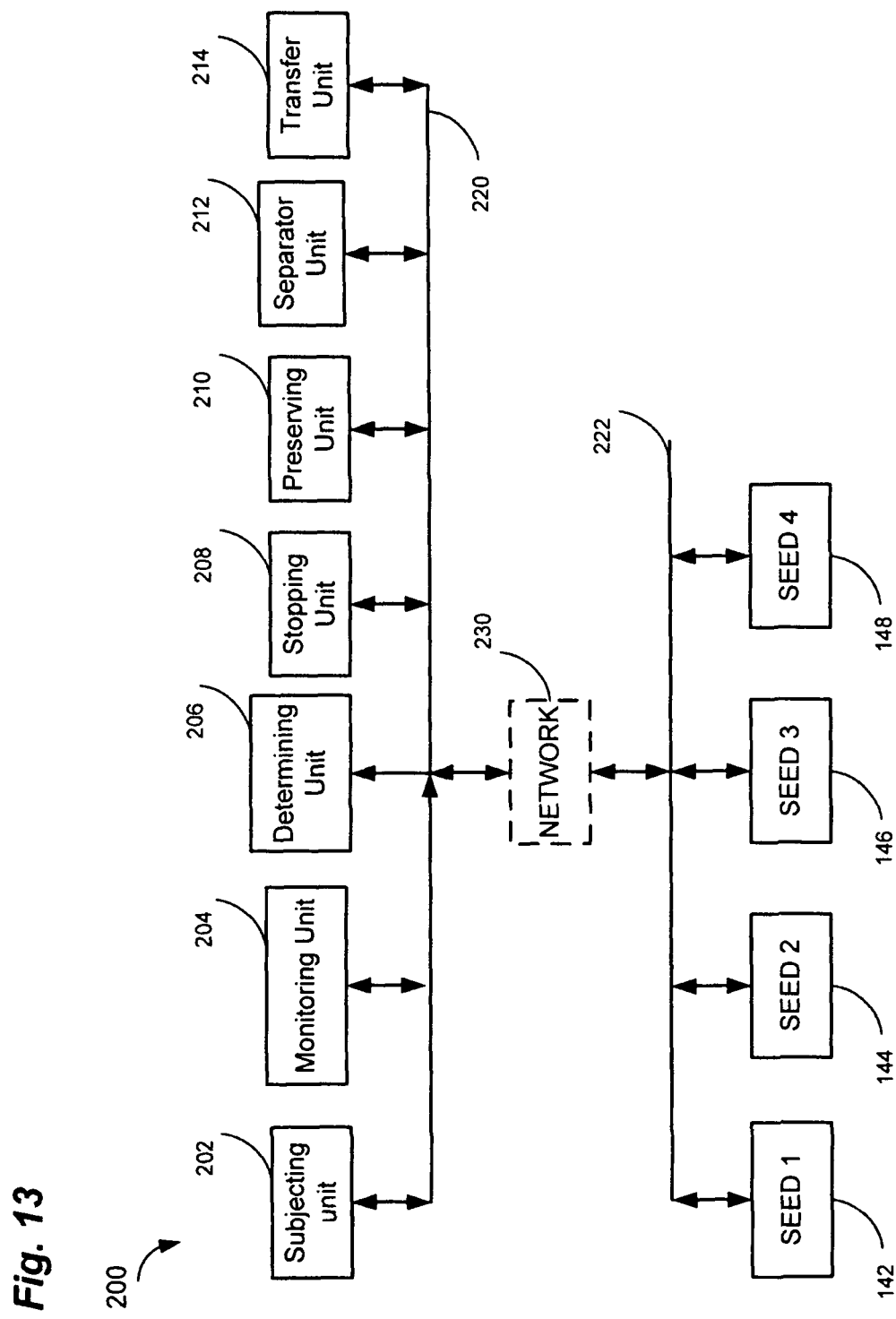
FIG. 13 is a diagram of another example of a system for monitoring and separating seeds for commercial use or sale.

As shown in the system 200 of FIG. 13, another exemplary system for producing a group of seeds for commercial use or sale includes: a subjecting unit 202 configured to subject each and every seed to a growth-inducing or germination-inducing environment; a monitoring unit 204 configured to monitor the subjected seed for a development indication of a specific characteristic; a determining unit 206 configured to determine if an achieved state is a positive indication of the specific characteristic, for example the achieved state may include a specific development rate toward a specific characteristic; a stopping unit 208 configured to stop the subjected seed from further growth when a state (i.e., rate of development) associated with the specific characteristic is achieved; a preserving unit 210 configured to preserve the seed determined as having the positive indication of the specific characteristic; a separator unit 212 configured to separate the seed determined as having the specific characteristic; a transfer unit 214 configured to transfer at least a portion of the separated seeds into a group for commercial use or sale so that each and every seed in the group has been monitored and determine to have the specific characteristic.

FIG. 12 and FIG. 13 show examples of embodiments of the system for producing a group of seeds for commercial use or sale. For example, the system may include an monitoring unit 102 which is configured to monitor a seed using any of the methods and examples listed herein and the different types of analysis that could be used in monitoring and testing for a physiological indication or a morphometric indication of seed development which would be indicative of a specific characteristic. For example, the monitoring unit 1102 may include a subjecting unit 202 for subjecting a seed to any particular environment described herein based on what specific characteristic is to be determined, or the subjecting unit 202 may be independent of the monitoring unit 102. Any of units 102-108 and 202-214, shown in FIG. 12 and FIG. 13, can be integral to the other units 102-108 and 202-214 which make up the system or can be functioning independently with or without coupling means 120, 122, 220, 222. For example, the communication network 130 and 230 may include a process controller, or low level communications such as analog control signals, or a distributed networking environment such as one which has multiple processors working together to coordinate some or all of the unit functionalities, or some combination of these networks 130 and 230 and their coupling means 120, 122, 220, 222 in order to produce the group of seeds with the steps described in the embodiments disclosed herein. Also, coupling means 120, 122, 220, 222 may be in the form of a conveyor belt, pipe, conduit, vacuum tube, or and transport device or combination of such that moves a seed 1122 from one area of the system to another so that the system units 1102-1108 and 1202-1214 can accomplish their functions with respect to the seed 142. Also, the coupling means 120, 122, 220, 222 may be electrical, mechanical, vacuum, and robotic equipment capable of moving with respect to the seed's location. Further, the individual seeds 142-148 may be run simultaneously or sequentially through any of the individual units 102-108 and 202-214 of the system.

The state monitoring unit 204 of FIG. 13 is capable of monitoring for all the stages associated with any of the specific characteristics described herein. Separator unit 106 and 212 and transfer unit 108 and 214 of FIG. 11 and FIG. 13 correspond to any of the possible devices capable of separating a seed out from its test environment, such as by use of any electrical, mechanical, hydraulic, magnetic, vacuum device or combination thereof. Likewise, the stopping unit 208 of FIG. 13 is capable of stopping the subjecting unit 202 from further subjecting the seed 142 at any state (or rate of development) toward development of a desired specific characteristic as may be detected by the state monitoring unit 204. Further, the preservation or preserving unit 210 may be used to preserve or dry the seed 142 so that the seed can remain in the desired state toward the desired specific characteristic. Units 102-108 and 202-214 may all be included in the system or may be separated or combined into further delineated units as required by the method the system uses corresponding to any of the herein described tests used in the production of the package of seeds where each seed has been monitored and determined to have the specific characteristic.

As is clear to one of ordinary skill in the art the herein example embodiments are intended to be illustrative and not limiting.

Figure 14:
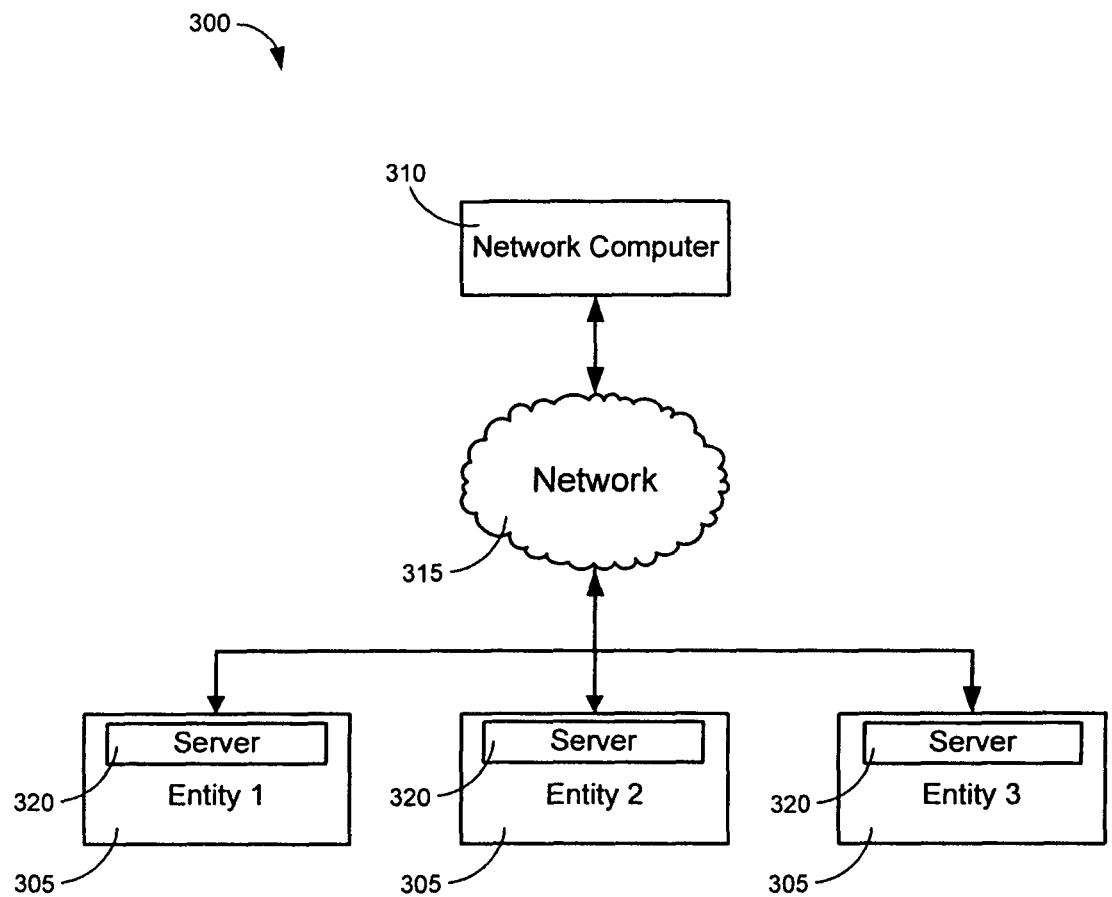
FIG. 14 is a diagram of an example data network used by the embodiments of the system for monitoring and separating seeds for commercial use or sale.

In order to implement the systems 100 and 102 described in FIGS. 11 and 12, the network system 300 and computer system 400 may be used. FIG. 14 illustrates an embodiment of a data network 300 including a first group of facilities or entities 305 operatively coupled to a network computer 310 via a network 315. The entities 305 may be physically co-located or geographically disparate. The plurality of entities 305 may be located, by way of example rather than limitation, in separate geographic locations from each other, in different areas of the same city, or in different states. Generally, the entities 305 may represent any of the different types of entities that may be involved in monitoring a physiological indication of a seed; automatically determining if the monitored seed has a specific characteristic; separating the monitored seeds having the specific characteristic; transferring at least a portion of a plurality of separated seeds into a group for commercial use or sale so that each and every seed in the group has been monitored and determined to have the specific characteristic; subjecting a seed to a growth-inducing or germination-inducing environment; monitoring the subjected seed for a physiological or morphometric indication or any other development indication of a specific characteristic; stopping subjecting the seed to growth-inducing environment when a state associated with the specific characteristic is achieved; determining if the achieved state is a positive indication of the specific characteristic; preserving the seed determined as having the positive indication; monitoring the indication of the specific characteristic for each and every seed in a first group of seeds from the group of seeds; and generating a result-based comparator, based on a result of the first group analysis, to use in determining if the achieved state is the positive indication of the specific characteristic. For example, the entities 305 may represent a monitoring unit; a determination unit; a monitoring unit; a subjecting unit; a determining unit; a stopping unit; a first monitoring unit; a result-based comparator generator; a preserving unit; or a transfer unit. Any of the entities 305 may also be an intermediary between an monitoring unit; a determination unit; a separator unit; a monitoring unit; a subjecting unit; a determining unit; a stopping unit; a first monitoring unit; a result-based comparator generator; a preserving unit; a transfer unit, and any of the other entities 305 described herein.

The network 315 may be provided using a wide variety of techniques that are well known to those skilled in the art for the transfer of electronic data. For example, the network 315 may comprise dedicated access lines, plain ordinary telephone lines, satellite links, combinations of these. Additionally, the network 315 may include a plurality of network computers or server computers (not shown), each of which may be operatively interconnected in a known manner. Where the network 315 comprises the Internet, data communication may take place over the network 315 via an Internet communication protocol.

The network computer 310 may be a personal computer or a server computer of the type commonly employed in networking solutions. The network computer 310 may be used by an entity 305 to monitoring a physiological and/or morphometric indication of a seed; automatically determining if the monitored seed has a specific characteristic; separating the monitored seed having the specific characteristic into a group for commercial use or sale so that each and every seed in the package has been monitored and determined to have the specific characteristic; subjecting each and every seed in a group of seeds to a growth-inducing or germination-inducing environment; monitoring the subjected seed for a indication of a specific characteristic; stopping subjecting the seed from more subjecting of the growth-inducing or germination-inducing environment when a state associated with the specific characteristic is achieved; determining if the achieved state is a positive indication of the specific characteristic; preserving the seed determined as having the positive indication; monitoring the indication of the specific characteristic for each and every seed in a first group of seeds from the group of seeds; and generating a result-based comparator, based on a result of the first group analysis, to use in determining if the achieved state is the positive indication of the specific metabolic characteristic.

For example, the network computer 310 may periodically receive data from each of the entities 305 indicative of information pertaining to seed test data, specific seed characteristic data; seed sorting request data, seed sorting process plant data, seed environment data, result-based comparator data. A process plant module, control module, statistical module, business module, management module, production module, monitor module; determination module; separator module; monitoring module; a subjecting module; a determining module; a stopping module; a separator module; first monitor module; result-based comparator generator module; preserving module; transfer module, or other entity may use the network computer 310 to access and view information served from other network computers or servers 320 at the entities 305. For example, as a client/server model, the entities 305 may include one or more servers 320 that may be utilized to store any of the information described herein and to serve the information to a network computer 310 acting as the client.

In one embodiment, the network computer 310 or any of the entities 305 includes an interface to a seed grouping modeling and analysis system and a seed grouping records management system at an entity 305. For example, the network computer 310 may be connected to a seed grouping modeling and analysis system and any suitable seed grouping records management system, or any other type of distributed system that may be used to implement a system for commercially selling a plurality of seeds. From a network computer 310, an operator of the system or other business, maintenance, managerial operator, or other entity 305 may log into a seed grouping records system that is communicatively coupled to a server 320 within an entity 305.

Although the data network 300 is shown to include one network computer 310 and three entities 305, it should be understood that different numbers of computers and entities may be utilized. For example, the network 300 may include a plurality of network computers 310 and dozens of entities 305, all of which may be interconnected via the network 315. According to the disclosed example, this configuration may provide several advantages, such as, for example, enabling nearly real time uploads and downloads of information as well as periodic uploads and downloads of information. This provides for a primary backup of all the information generated in the process of implementing a system for commercially selling a plurality of seeds.

The computer 310 may be connected to a network, including local area networks (LANs), wide area networks (WANs), portions of the Internet such as a private Internet, a secure Internet, a value-added network, or a virtual private network. Suitable network computers 310 may also include personal computers, laptops, workstations, disconnectable mobile computers, mainframes, information appliances, personal digital assistants, and other handheld and/or embedded processing systems. The signal lines that support communications links to a computer 310 may include twisted pair, coaxial, or optical fiber cables, telephone lines, satellites, microwave relays, modulated AC power lines, and other data transmission "wires" known to those of skill in the art. Further, signals may be transferred wirelessly through a wireless network or wireless LAN (WLAN) using any suitable wireless transmission protocol, such as the IEEE series of 802.x standards. Although particular individual and network computer systems and components are shown, those of skill in the art will appreciate that the present invention also works with a variety of other networks and computers.

Figure 15:
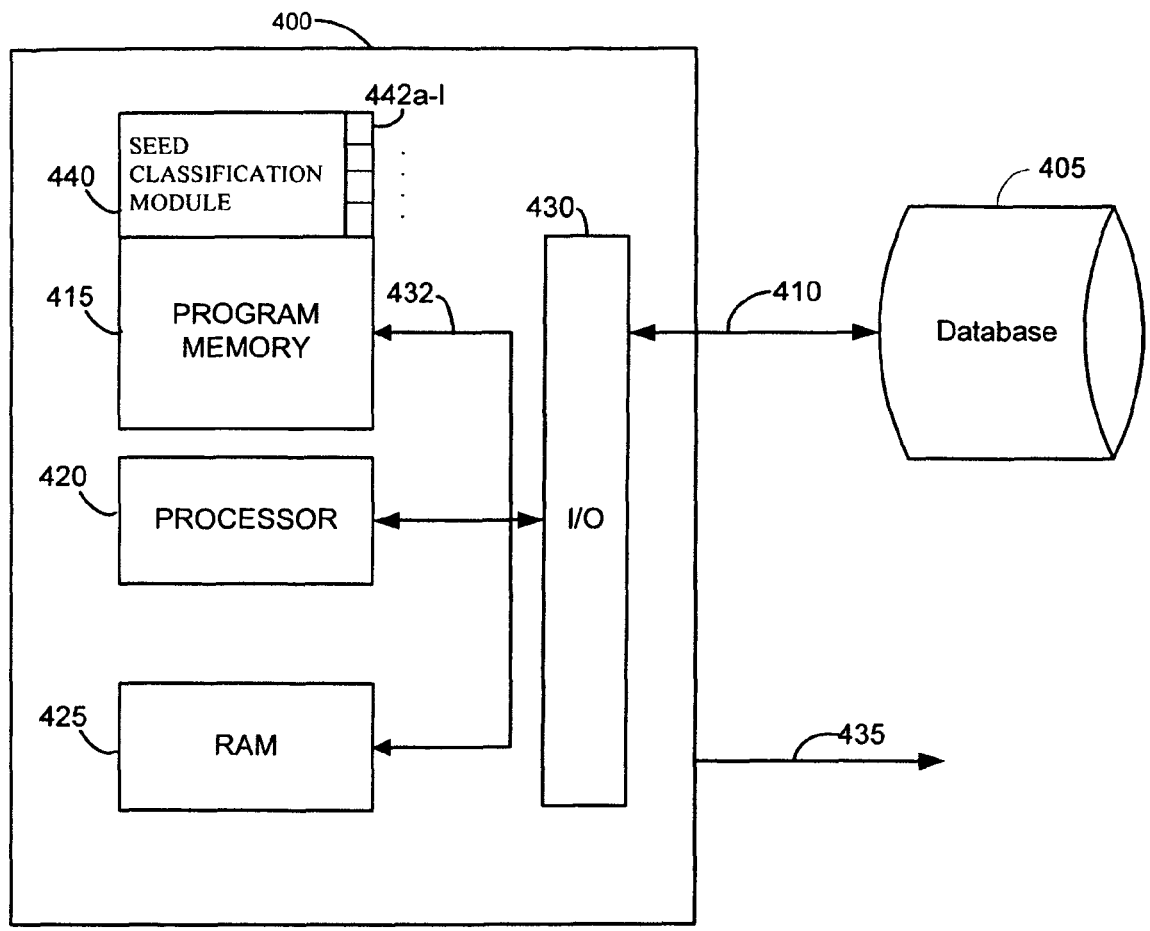
FIG. 15 is a diagram of an example network computer used by the embodiments of the system for monitoring and separating seeds for commercial use or sale.

FIG. 15 is a schematic diagram of one possible embodiment of the network computer 310 shown in FIG. 14. The network computer 310 may have a controller 400 that is operatively connected to a database 405 via a link 410. It should be noted that, while not shown, additional databases may be linked to the controller 400 in a known manner. The controller 400 may include a program memory 415, a processor 420 (may be called a microcontroller or a microprocessor) for executing computer executable instructions, a random-access memory (RAM) 425 for temporarily storing data related to the computer executable instructions, and an input/output (I/O) circuit 430 for accepting and communicating the computer executable instructions, data for producing results with the computer executable instructions that are executed on the processor 420, and the results of any executed computer executable instructions. In one embodiment, the program memory 415 includes a seed classification 440 to implement one or more methods for producing a plurality of seeds for commercial use or sale, as described below in relation to FIGS. 2-5 and 12-15. In another embodiment (not shown) the seed classification module 440 may be a separately-implemented IC. The seed classification module may also include a plurality of modules to implement one or more methods, for example, an monitor module 442a; a determination module 442b; a separator module 442c; a monitoring module 442d; a subjecting module 442e; a determining module 442f; a stopping module 442g; a separator module 442h; a first monitor module 442i; a result-based comparator generator module 442j; a preserving module 442k; a transfer module 442l. The seed classification module 440, and the plurality of associated modules are discussed below in relation to FIGS. 2-5 and 12-15. Of course, many other implementations of the seed classification module 440 are possible.

The program memory 415, processor 420, and RAM may be interconnected via an address/data bus 432. It should be appreciated that although only one processor 420 is shown, the controller 400 may include multiple processors 420. Similarly, the memory of the controller 400 may include multiple RAMs 425 and multiple program memories 415. Although the I/O circuit 430 is shown as a single block, the I/O circuit 430 may include a number of different types of I/O circuits. The RAM(s) 425 and program memories 415 may be implemented as semiconductor memories, magnetically readable memories, and/or optically readable memories, for example. The controller 400 may also be operatively connected to the network 315 (FIG. 14) via a link 435.

What is claimed is:

1. A method in a computer system for producing a group of growth-induced seeds for commercial use or sale, the method comprising:
subjecting a seed to a growth-inducing procedure;
monitoring, with one or more processors, the subjected seed for a rate of development toward a specific characteristic, indicated by one or more of a group including: a physiological indicator associated with the specific characteristic and a morphometric indicator associated with the specific characteristic;
determining, with one or more processors, whether the seed has a specific rate of development toward the specific characteristic;
stopping subjecting the seed to the growth-inducing procedure when the specific rate of development is achieved;

preserving the seed determined as having the specific rate of development; and separating the seed determined as having the specific rate of development into the group of growth-induced seeds for commercial use or sale so that every seed of the group has been monitored and determined to have a rate of development similar to the specific rate of development.

2. A method according to claim 1, wherein the specific characteristic is a plurality of characteristics and the rate of development toward the specific characteristic includes a plurality of rates which correspond to the plurality of characteristics.

3. A method according to claim 1, wherein the monitoring and the determining are each performed repeatedly for each of the subjected seeds.

4. A method according to claim 3, further comprising sorting at least a portion of the group of germinated seeds for commercial use or sale in one or more of a group including a package, a plurality of germinated seeds, a plurality of seedlings, a plurality of young plants, a well plate including a plurality of germinated seeds, a seedling growing tray including a plurality of seedlings, a plurality of cells of a seedling growing tray, and a plurality of plugs.

5. A method according to claim 3, wherein the commercial use or sale includes one or more of a group including planting, seeding, growing in pots, growing in trays, growing in cells, sowing outside in a field, sowing into synthetic media, arms length transfer, and sale.

6. A method according to claim 3, further comprising sorting at least a portion of the group of germinated seeds for commercial use or sale as a group of germinated seeds where each seed has reached a similar development stage with respect to the other seeds of the portion.

7. A method according to claim 3, wherein monitoring for the development stage includes monitoring for a metabolic signal associated with the specific characteristic.

8. A method according to claim 7, wherein monitoring for the metabolic signal comprises monitoring for oxygen consumption.

9. A method according to claim 8, wherein monitoring for oxygen consumption comprises one or more of a group including determining fluorescence quenching and determining chemoluminescence.

10. A method according to claim 3, wherein monitoring for the development stage includes monitoring for one or more of a group including a physiological indicator, a morphometric indicator, a combination of a plurality of physiological indicators, a combination of plurality of metamorphic indicators, and a combination of a plurality of physiological indicators and a plurality of morphometric indicators.

11. A method according to claim 10, wherein monitoring for the combination of the physiological indicator and the morphometric indicator, is done at one of substantially the same time or at different times.

12. A method according to claim 3, wherein the monitoring for the morphometric indicator comprises taking spectral images of morphometric information of the subjected seed.

13. A method according to claim 3, further comprising stopping the growth-induced seed from further subjection to the growth-inducing procedure.

14. A method according to claim 13, further comprising subjecting the seed to one or more of a group including temperature, a growth regulator, and drying.

15. A method according to claim 14, wherein the temperature is in the range of 0 to 5° C.

16. A method according to claim 14, wherein the growth regulator is one or more of a group including ancymidol, chlormequat chloride, daminozide, paclobutrazol, and uniconazole.

17. A method according to claim 16, further comprising adjusting the rate of development of the seed.

18. A method according to claim 3, wherein the specific characteristic is an ability to germinate under specific environmental conditions or stresses.

* * * * *